United States Patent
Baranowski

[11] Patent Number: 5,833,180
[45] Date of Patent: Nov. 10, 1998

[54] COMPUTER MOUSE OPERATION PAD AND FOREARM SUPPORT ASSEMBLY

[75] Inventor: James P. Baranowski, Waterford, Wis.

[73] Assignee: The Mousebar Company, Waterford, Wis.

[21] Appl. No.: 771,425

[22] Filed: Dec. 20, 1996

Related U.S. Application Data

[60] Provisional application No. 60/015,030, Apr. 8, 1996.

[51] Int. Cl.$^6$ ...................................................... B68G 5/00
[52] U.S. Cl. ......................... 248/118; 248/918; 248/228.3
[58] Field of Search ................................. 248/118, 118.1, 248/118.3, 118.5, 918, 231.41, 231.81, 226.11, 228.3, 228.5, 230.3, 230.5, 231.61, 205.3

[56] References Cited

U.S. PATENT DOCUMENTS

| | | | |
|---|---|---|---|
| 2,461,256 | 2/1949 | Black | 248/231.61 |
| 3,929,309 | 12/1975 | De Vore | 248/118 |
| 4,025,015 | 5/1977 | Kolic | 248/205.3 |
| 5,074,501 | 12/1991 | Holtta | 248/118.3 |
| 5,125,606 | 6/1992 | Cassano et al. | 248/118 |
| 5,131,614 | 7/1992 | Garcia et al. | 248/118 |
| 5,161,760 | 11/1992 | Terbrack | 248/118 |
| 5,244,296 | 9/1993 | Jensen | 400/715 |
| 5,335,888 | 8/1994 | Thomsen | 248/118.1 |
| 5,340,067 | 8/1994 | Martin et al. | 248/918 |
| 5,355,147 | 10/1994 | Lear | 345/156 |
| 5,370,570 | 12/1994 | Harris | 248/231.61 |
| 5,405,109 | 4/1995 | Nordnes | 248/918 |
| 5,542,637 | 8/1996 | Schriner | 248/118 |
| 5,556,061 | 9/1996 | Dickie | 248/118 |
| 5,562,270 | 10/1996 | Montague | 248/118.1 |
| 5,674,423 | 10/1997 | Wright, Sr. | 248/118 |

Primary Examiner—Leslie A. Braun
Assistant Examiner—Anita M. King
Attorney, Agent, or Firm—Whyte Hirschboeck Dudek SC

[57] ABSTRACT

A computer mouse operation pad and forearm support assembly for providing forearm and wrist support to a user operating a computer mouse on a computer mouse operation pad from a sitting position, the assembly compromising (i) an integrated unit formed by joining a computer mouse operation pad to a forearm support in such a manner that a front region is defined by the computer mouse operation pad, a back region is defined by the forearm support, and a middle region is defined by the natural repose of the wrist of the user when the forearm of the user is resting upon the forearm support while the user is operation the computer mouse on the computer mouse operation pad, and (ii) a clamp for attaching the assembly to a worksurface having top, front and bottom surfaces, the integrated unit attached rotatively to the clamp.

34 Claims, 17 Drawing Sheets

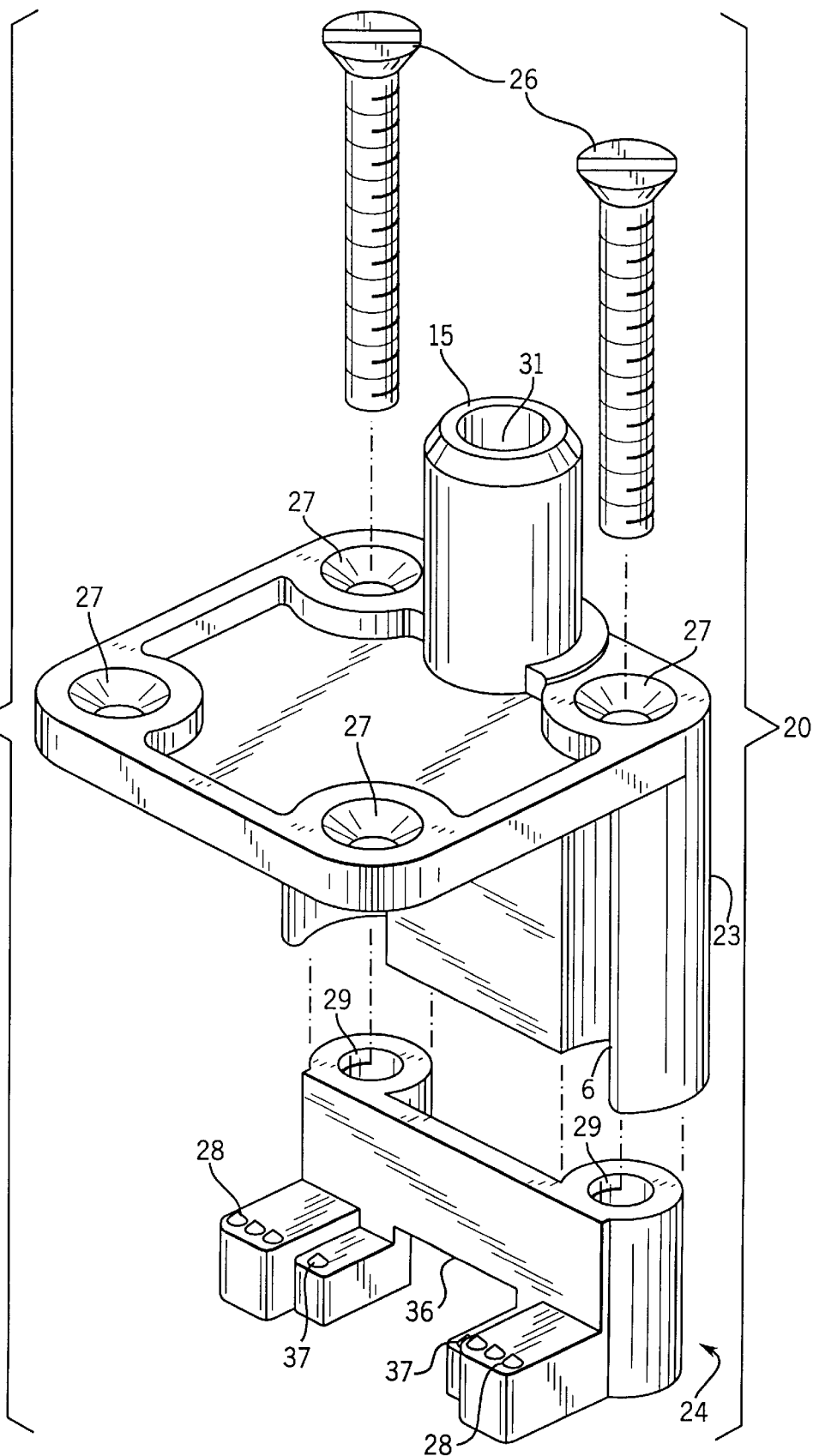

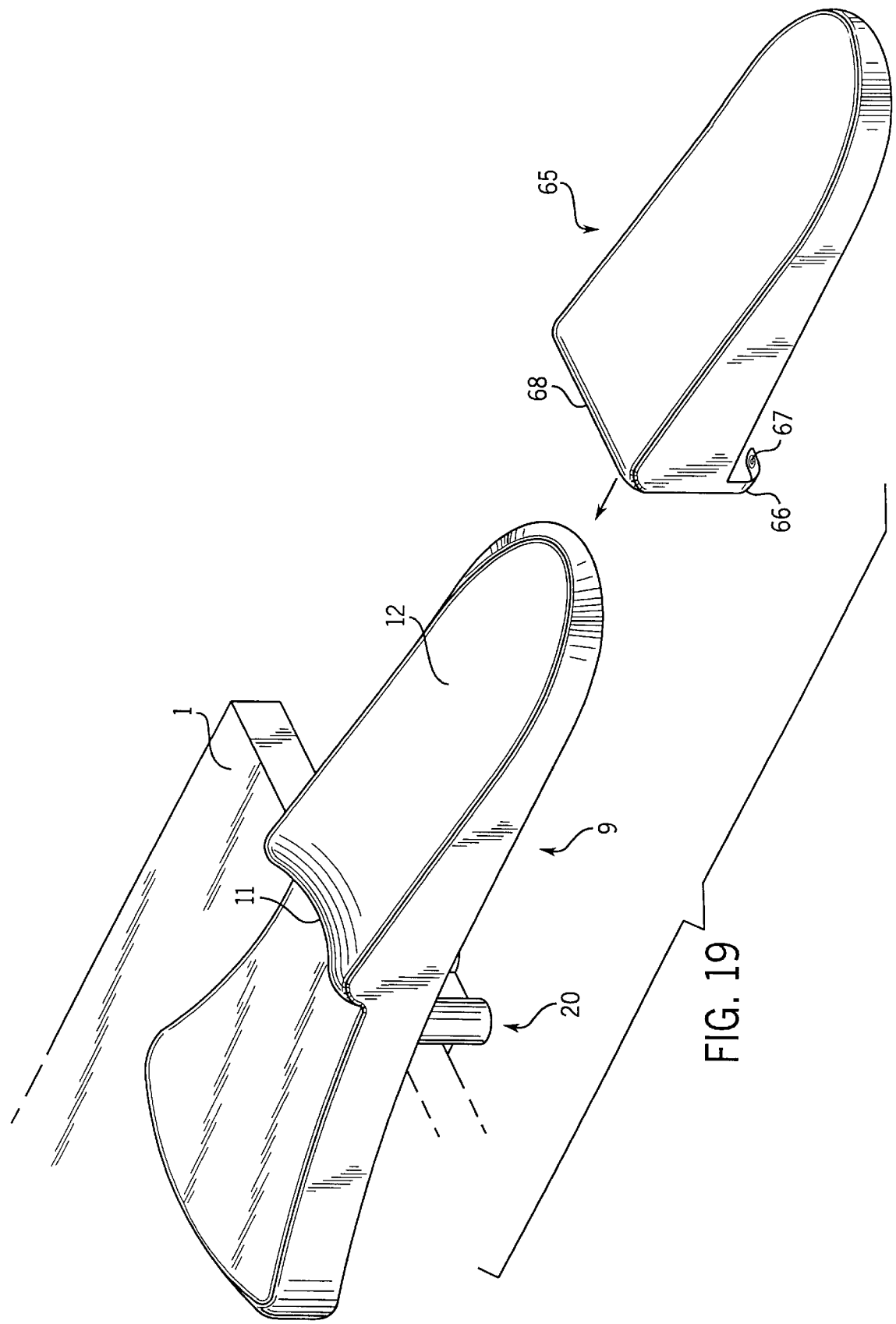

5,833,180

COMPUTER MOUSE OPERATION PAD AND FOREARM SUPPORT ASSEMBLY

CROSS-REFERENCE TO RELATED APPLICATIONS

This application claims the benefit of U.S. Provisional Application Ser. No. 60/015,030 filed Apr. 8, 1996.

STATEMENT REGARDING FEDERALLY SPONSORED RESEARCH OR DEVELOPMENT

Not Applicable.

BACKGROUND OF THE INVENTION

This invention relates to ergonomic office equipment. In one aspect, this invention relates to computer mouse operation pads while in another aspect, this invention relates to an integrated assembly that provides forearm and wrist support in combination with a computer mouse operation pad. In yet another aspect, this invention provides an assembly in which the integrated support device is pivotally or rotatively attached to a clamp for engaging the assembly to a worksurface.

Due to the increasing use of computers in all aspects of daily life, fatigue, soreness and potential ligament disorders are common. In particular, the ubiquitous computer mouse has its own set of operational problems and effects on the human user. Common operational problems with the mouse include providing a flat, unobstructed operation area close to the computer keyboard (which is typically located on a desktop or other worksurface). This operation area must also have the correct tractive surface so that the mouse sensorball does not slip on the surface. This problem of slippage has been addressed in a myriad of ways by the common mousepad which provides a nonslip surface for the operation of the mouse.

Common effects on the human user are many. Users often find themselves bracing their arm against the sharp edge of a desktop while using the mouse. This presents discomfort to the lower forearm by not spreading the forearm pressure over a large enough area. Another common technique is to move the mouse forward on the desktop in such a manner that the desktop provides a comfortable amount of forearm support. The two primary disadvantages to this technique are (i) a lack of space on the common desktop to allow this position (thus forcing poor wrist-up posture which in turn leads to fatigue), and (ii) the necessity of having to move the user's chair uncomfortably close to the desktop. Alternatively, the user can use the arm of the chair for forearm and wrist support, but generally this requires an awkward balance of the mouse pad on the chair arm and, of course, is possible only if the chair has an arm. Moreover, individual desk/chair arrangements do not always allow for this kind of postural positioning.

Various existing wrist supports, wrist pads, articulated arm supports, mousepad/wrist pads and ergonomic methods have confronted the problem of providing comfortable use of a computer mouse, but none have proven fully satisfactory. Accordingly, computer mouse users hold a continuing interest in alternative devices that provide an acceptable answer to this long felt need.

BRIEF SUMMARY OF THE INVENTION

This invention provides a computer mouse operation pad and forearm support assembly for providing forearm and wrist support to a user operating a computer mouse on a computer mouse operation pad from a sitting position, the assembly comprising:

(i) An integrated unit formed by joining a computer mouse operation pad to a forearm support in such a manner that a front region is defined by the computer mouse operation pad, a back region is defined by the forearm support, and a middle region is defined by the natural repose of the wrist of the user when the forearm of the user is resting upon the forearm support while the user is operating the computer mouse on the computer mouse operation pad, and (ii) Means for attaching the integrated unit to a worksurface having top, front and bottom surfaces, the integrated unit pivotally attached to the means.

The forearm support provides the correct and proper support of the user's forearm and wrist (it keeps both in a neutral or natural posture) while using the mouse, and thus reduces fatigue to the mouse user. The mouse operation pad provides a mouse operation flat with the proper tractive characteristics for the sensor ball of the mouse. The assembly is user friendly, and it is an inexpensive alternative to the various devices that are commercially available today.

The integrated unit is coupled with means for attaching or mounting the unit to all common work surfaces, e.g. desktops, tables, credenzas, chairarms, etc. These attachment or mounting devices are equipped with a pivot pin that provides rotational freedom for the integrated unit about the vertical axis (i.e. the axis normal to the worksurface), and they provide a large degree of freedom in terms of seating positions and postures for the user. The geometry of the integrated unit allows for usage by either right or left handed users. The surface of the forearm support can be covered with any one or more of a wide range of slip covers of various textures, colors, patterns and materials. These covers can address aesthetic, advertising and comfort concerns, e.g. color, nonallergenic, etc.

In one embodiment, the means for attaching the integrated unit to a worksurface comprises:

(A) A clamp body comprising (i) a pivot pin designed to fit pivotally within a hole boss attached to the bottom surface of the integrated unit, and (ii) a lateral member designed to engage the top surface of the worksurface;

(B) A clamp bottom designed to nest within the clamp body, the clamp bottom comprising a lateral member designed to engage the bottom surface of the worksurface; and (C) Means for nesting the clamp bottom within the clamp body and for drawing the lateral member of the clamp body into a gripping relationship with the top surface of the worksurface and the lateral member of the clamp bottom into a gripping relationship with the bottom surface of the worksurface.

In another embodiment, the means for attaching the integrated unit to a worksurface comprises a clamp body comprising (i) a pivot pin designed to fit pivotally within a hole boss attached to the bottom surface of the integrated unit, and (ii) a lateral member having an upper and a lower surface, the lower surface designed to engage fixedly the top surface of the worksurface.

In yet another embodiment, the means for attaching the integrated unit to a worksurface comprises:

(A) A clamp body comprising (i) a pivot pin designed to fit pivotally within a hole boss attached to the bottom surface of the integrated unit, and (ii) a slider securely attached to the pivot pin and comprising a contact face designed to engage the front surface of the worksurface; and (B) An L-shaped bottom mount bracket one leg of which slidingly nests within the slider and the other leg of which engages the bottom surface of the worksurface.

In still another embodiment, the means for attaching the integrated unit to a worksurface comprises a clamp body comprising (i) a pivot pin designed to fit pivotally within a hole boss attached to the bottom surface of the integrated unit, (ii) a slider securely attached to the pivot pin and comprising a contact face designed to engage the front surface of the worksurface, and (iii) means for securely fixing the slider at the contact face to the front surface of the worksurface.

One of the hallmarks of this invention is the integration of all of the characteristics of a mousepad, forearm and wrist support, rotation pivot and worksurface mounting into a single assembly. By integrating these functions into one simple and inexpensive device, the user can assume any number of postures and seating positions while still enjoying proper ergonomic and functional access to the movement of the mouse. This integration of desirable features provides the greatest amount of flexibility in work habits, individual user physiques and workspace considerations.

BRIEF DESCRIPTION OF THE SEVERAL VIEWS OF THE DRAWING

FIG. 6A is an exploded perspective view of one embodiment of a clamp assembly showing the component relationships.

FIG. 19 is a perspective view of a slipcover in a position for installation onto an integrated unit.

DETAILED DESCRIPTION OF THE INVENTION

In the accompanying drawings, like numerals are used to designate like parts.

In FIGS. 1–5, one embodiment of integrated unit 9 is shown in use. In this embodiment, the unit comprises a molded, cast or formed part of one or more of plastic, metal, wood or any other similar structural material. The preferred material of construction is plastic, and the preferred method of construction is injection molding. The top surface or contour of this embodiment has three distinct regions combined into one continuous surface. Front region 10 corresponds to the area below the user's hand, and is the region commonly referred to as a computer mouse operation pad or flat. This region has an appropriate surface texture (e.g. roughened) to provide the correct tractive surface for operation of the mouse sensorball. It also has an adequate amount of surface area to accommodate the range of motion required by the mouse, and it is typically coplanar to the desktop, i.e. level and horizontal.

Figure 16:
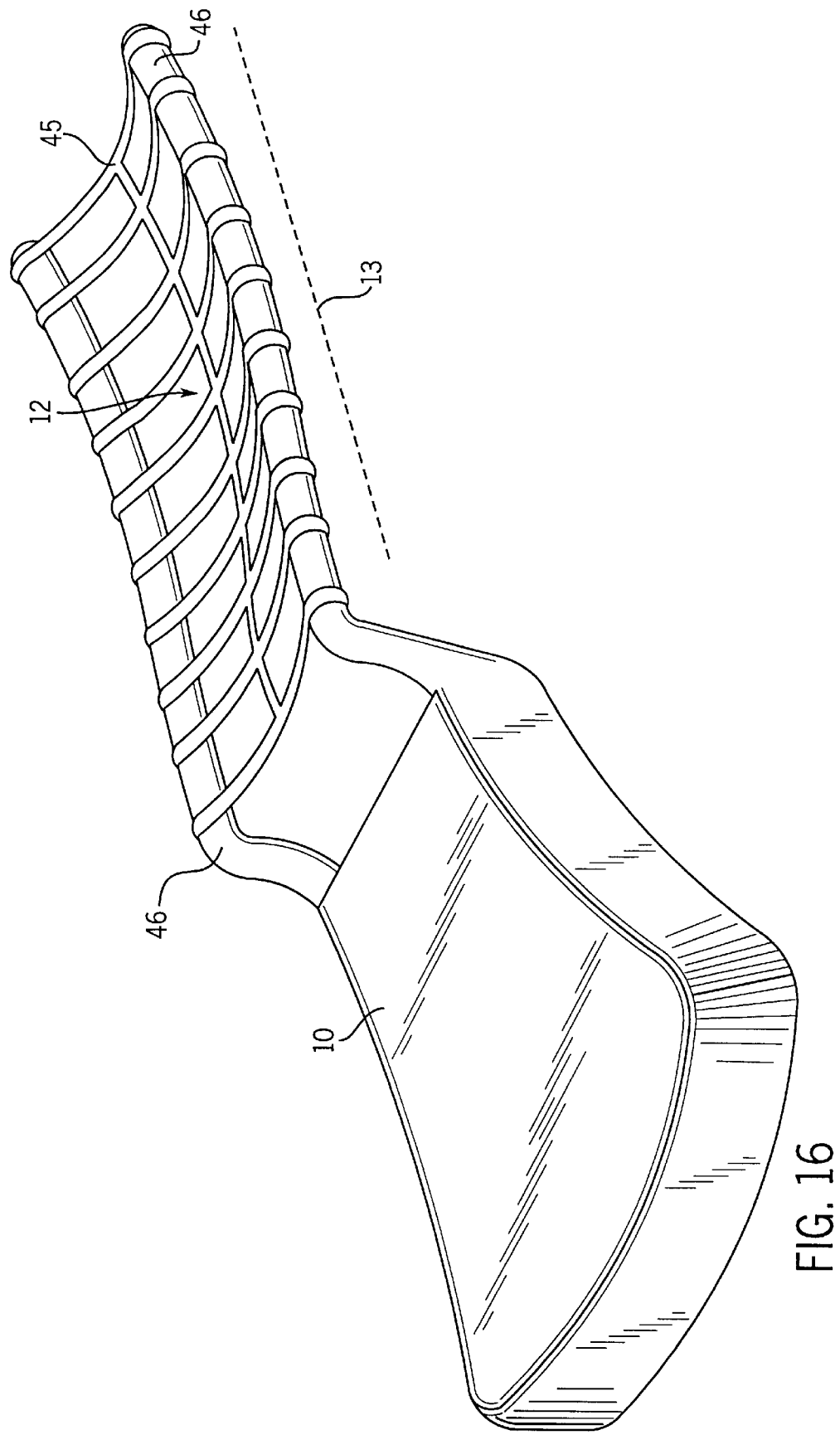
FIG. 16 is a perspective view of an integrated unit in which the forearm support comprises two parallel side rails extending from the computer mouse operation pad and a web or netting attached to the siderails to provide support for the forearm of a computer mouse user.
Figure 18A:
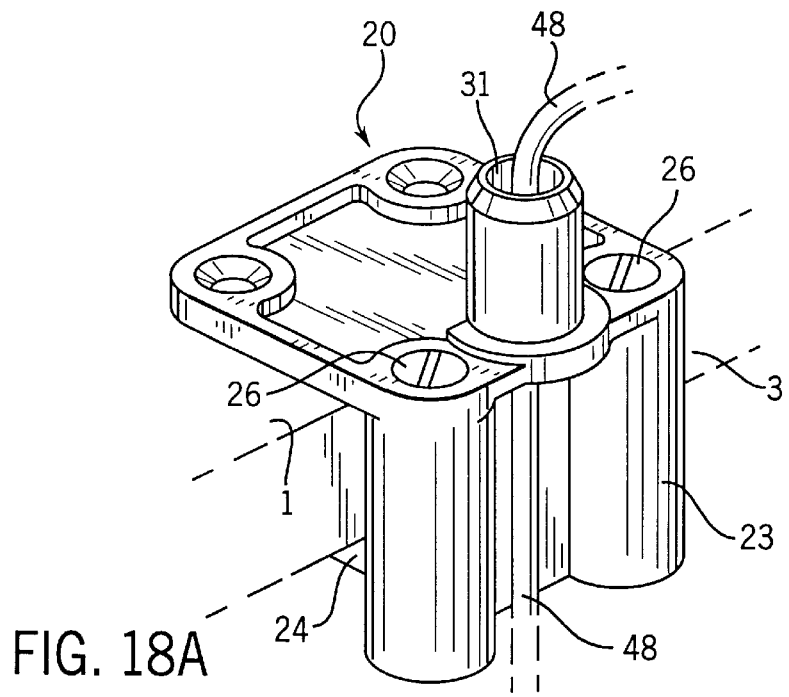
FIG. 18A is a top perspective view of the clamp assembly of FIG. 7 showing the passage of an electrical wire through the bore of the pivot pin.
Figure 18B:
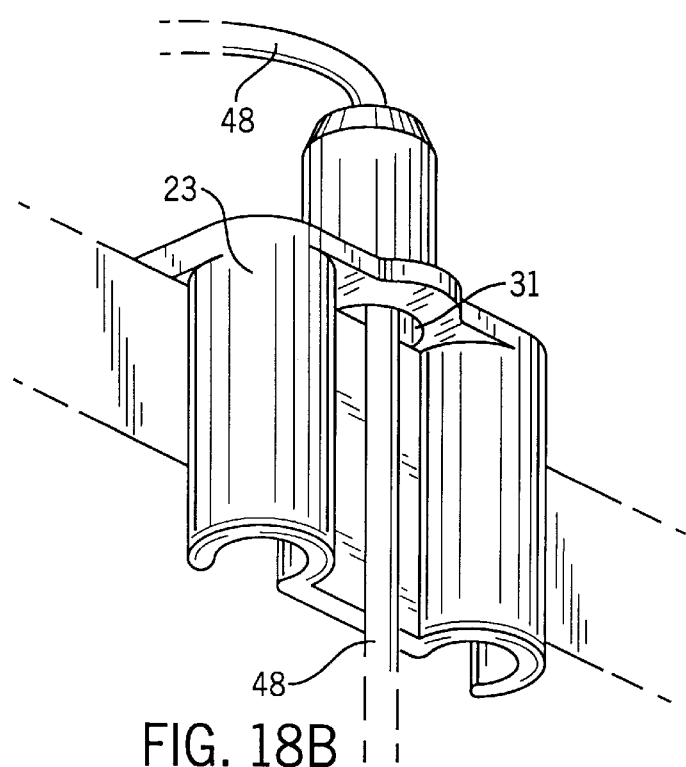
FIG. 18B is a bottom perspective view of FIG. 18A.
Figure 20:
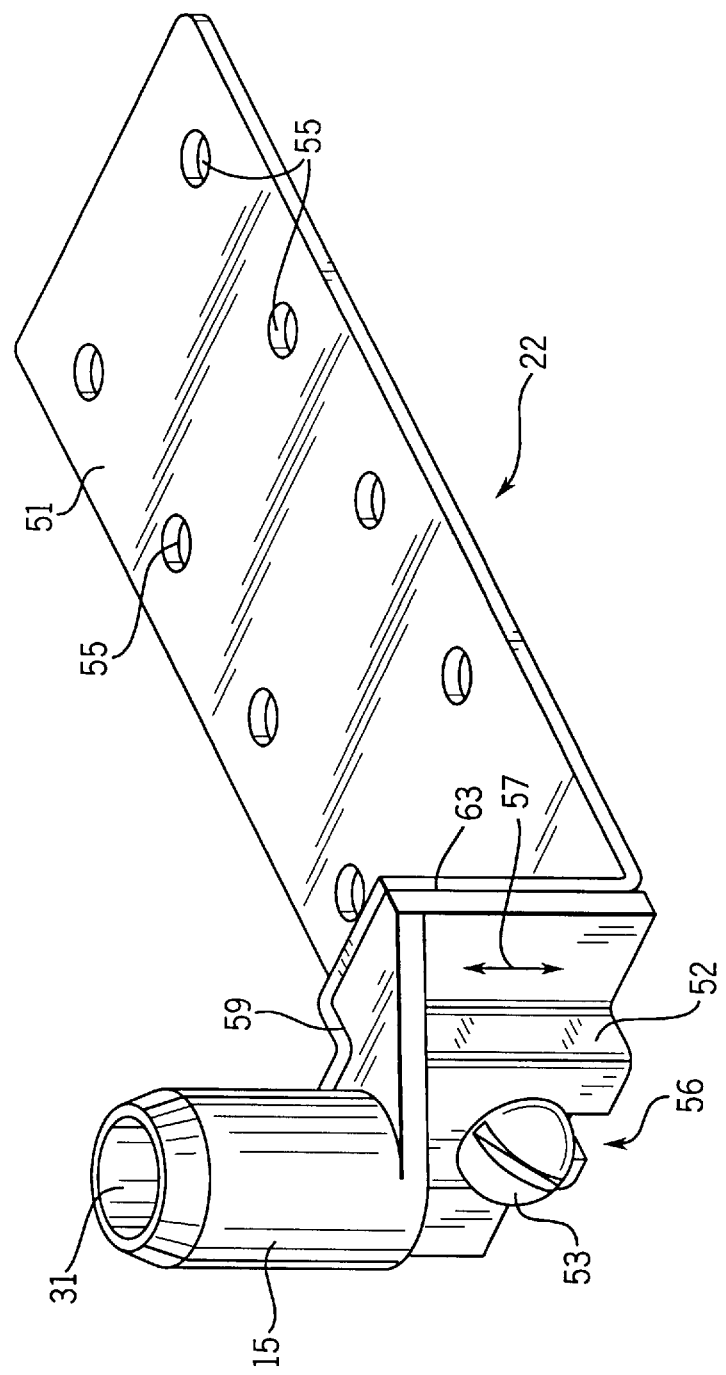
FIG. 20 is a perspective view of a bottom mount clamp assembly.
Figure 21:
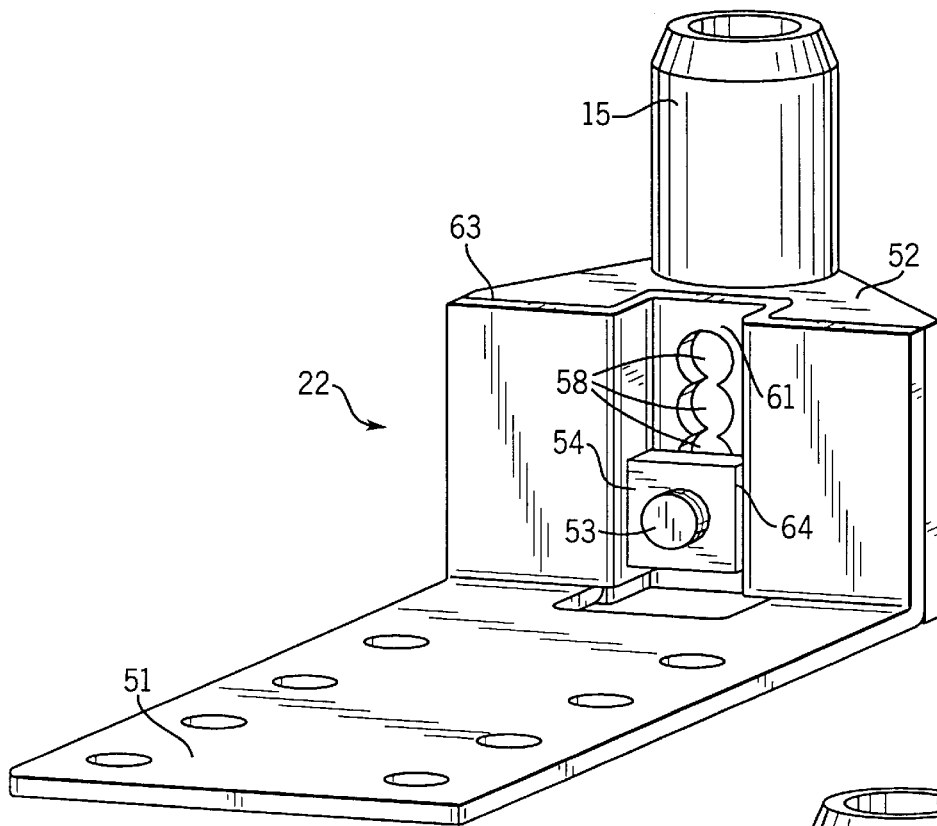
FIG. 21 is another perspective view of the bottom mount clamp assembly of FIG. 20 showing the vertical adjustment mechanism.
Figure 22:
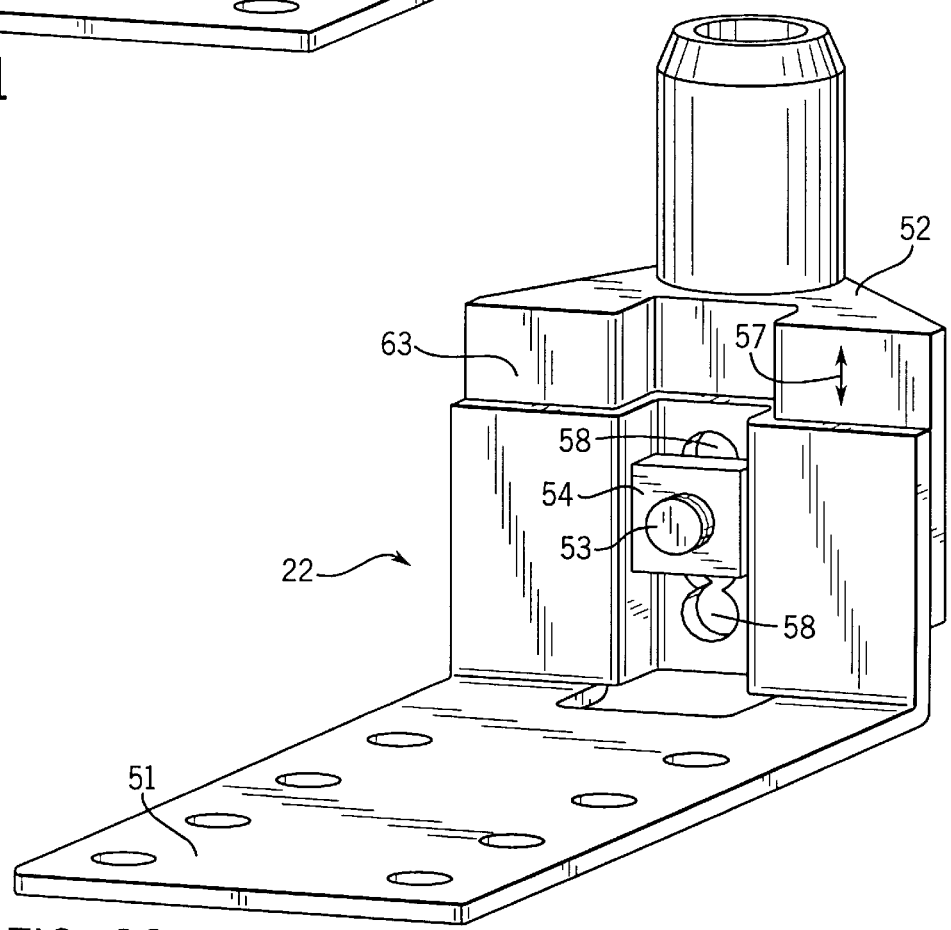
FIG. 22 is the same perspective view of the bottom mount clamp assembly of FIG. 21 after a height adjustment.
Figure 23:
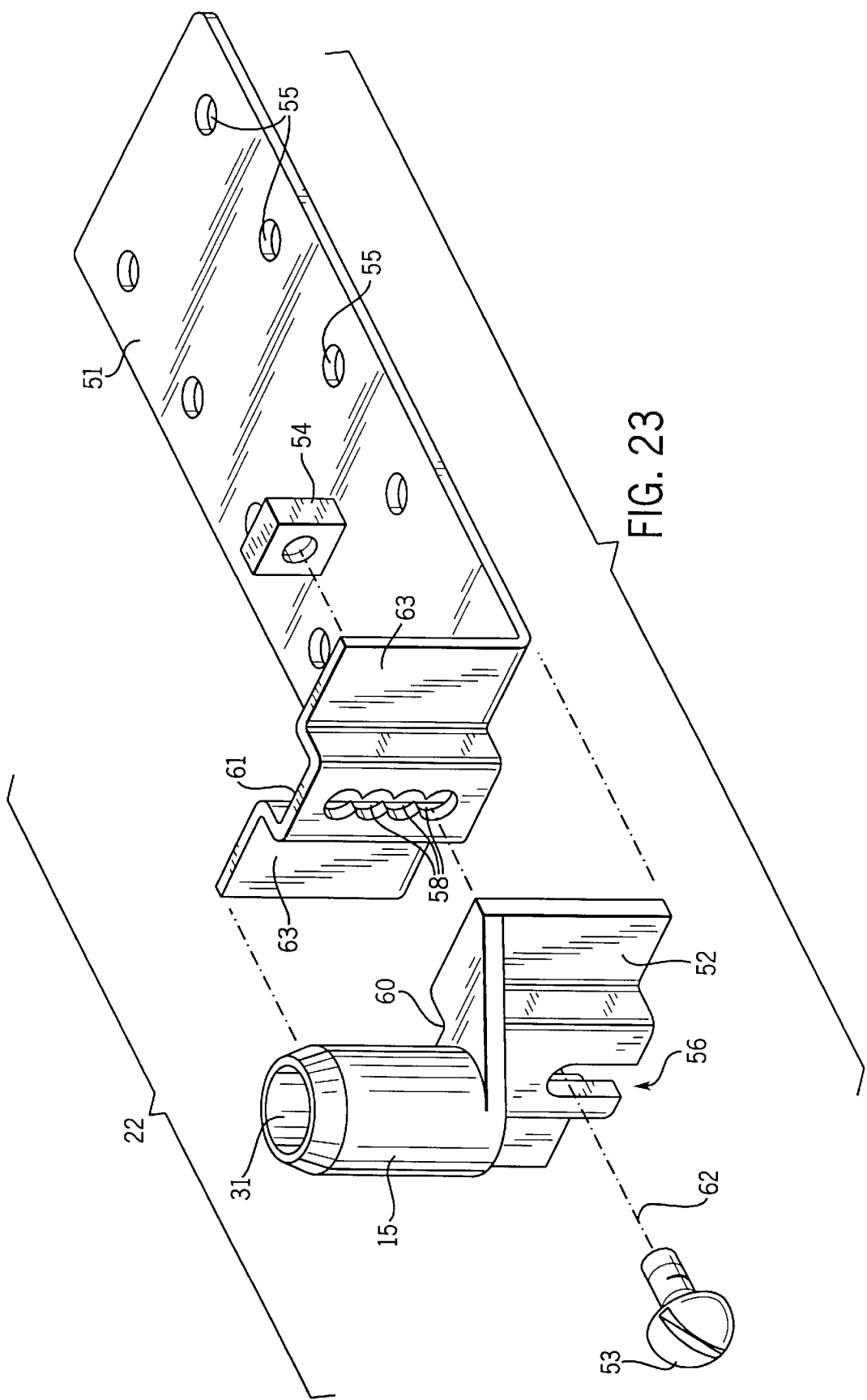
FIG. 23 is an exploded perspective view of the bottom mount clamp assembly of FIG. 20.
Figure 24:
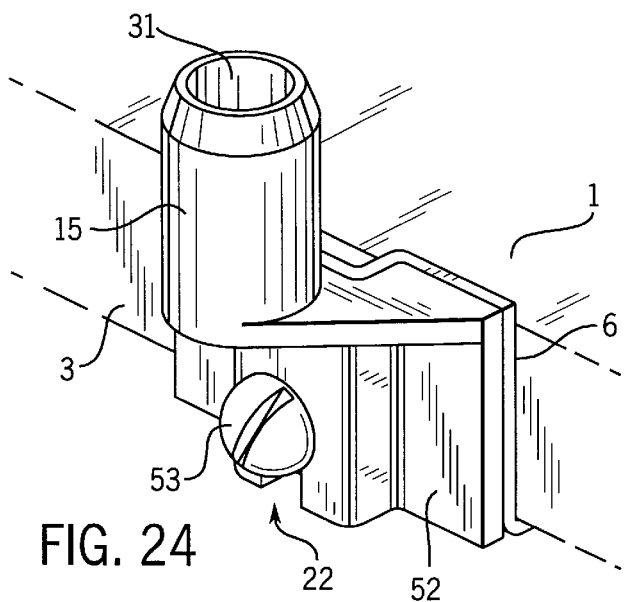
FIG. 24 is a perspective view of the bottom mount clamp assembly as installed on a worksurface.
Figure 25:
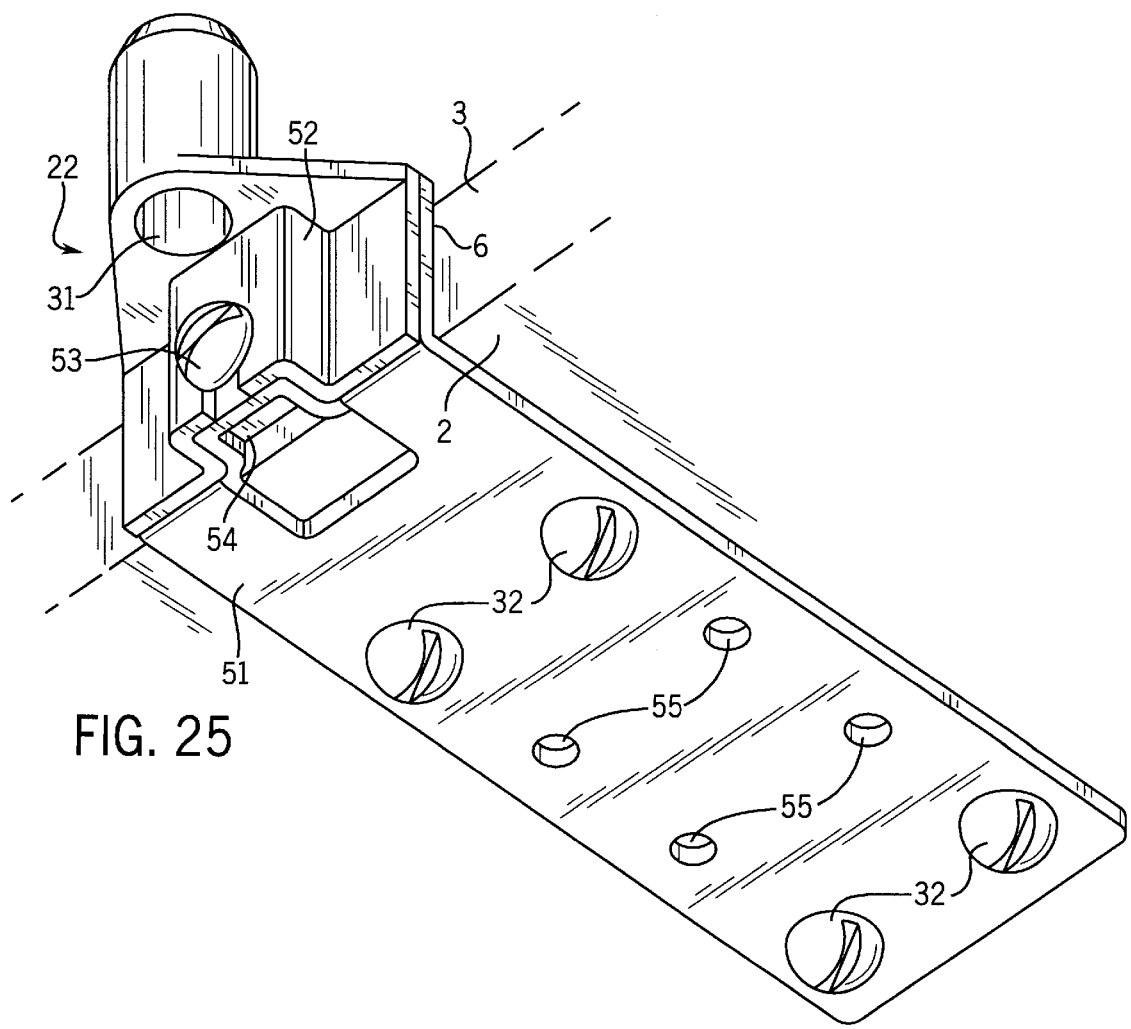
FIG. 25 is another perspective view of the bottom mount clamp assembly of FIG. 24 showing the method of installing the assembly to the bottom of the worksurface.

Middle region 11 is an area that is defined by the natural repose of the mouse cooperator's wrist when the operator's hand is on mouse 8 (which itself is on front region 10) and the operator's forearm is on back region 12. Typically this area comprises an appropriate complex curved surface that defines a slight elevation change between front region 10 and back region 12 (actually the forward area of back region 12 that adjoins middle region 11), and it provides the proper support and range of motion for the user's operation of the mouse. In certain embodiments, this region is an open space (as shown in FIG. 16). Middle region 11 also serves the function of providing a transition from operation flat 10 to back primary region 12.

Figure 2:
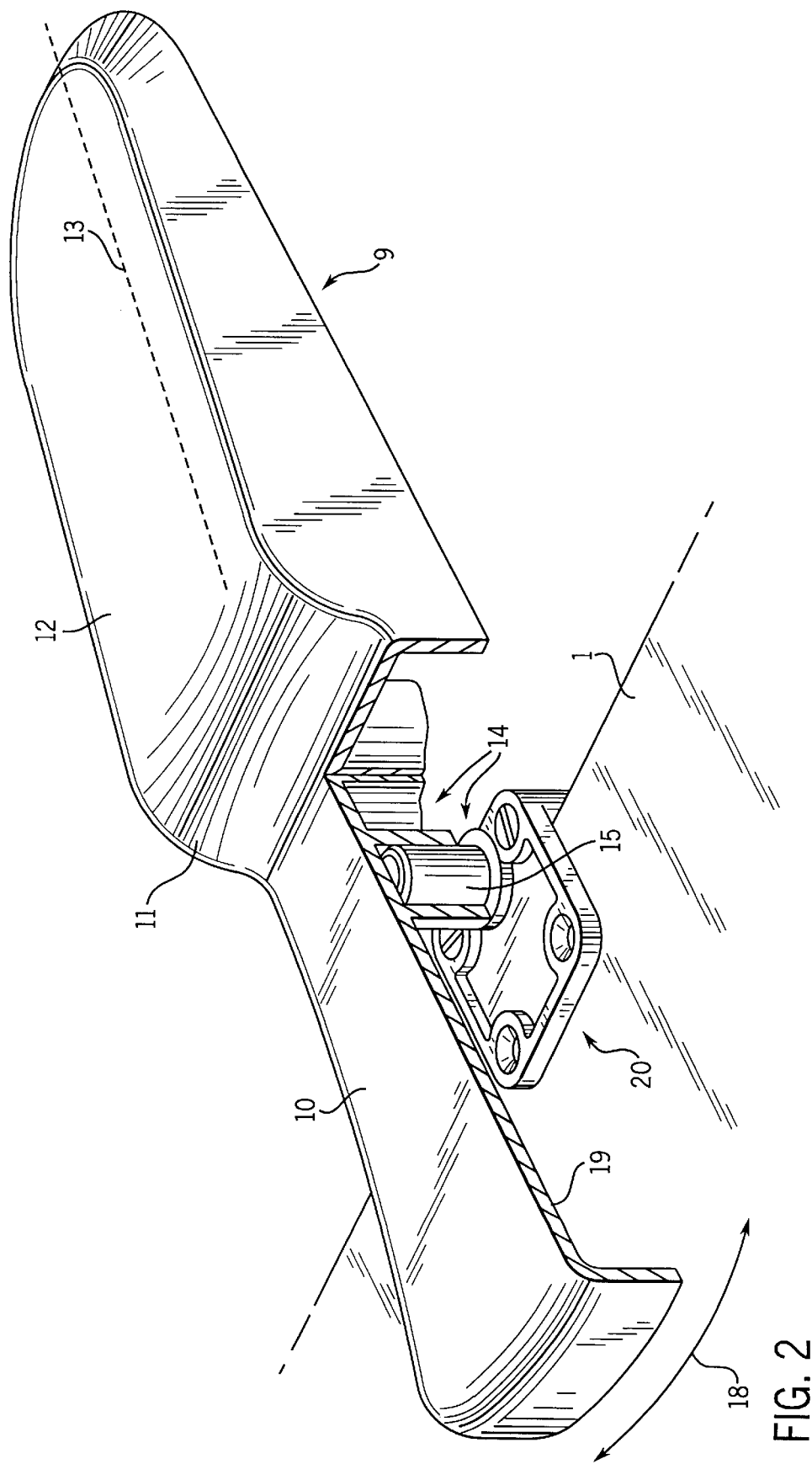
FIG. 2 is a cutaway perspective view of the assembly as attached to a worksurface. Included in this view is detail of one variant of the means for attaching the integrated unit to a worksurface. Also shown is the material cross section of the integrated unit and the rotational movement of the integrated unit on the pivot pin.
Figure 3:
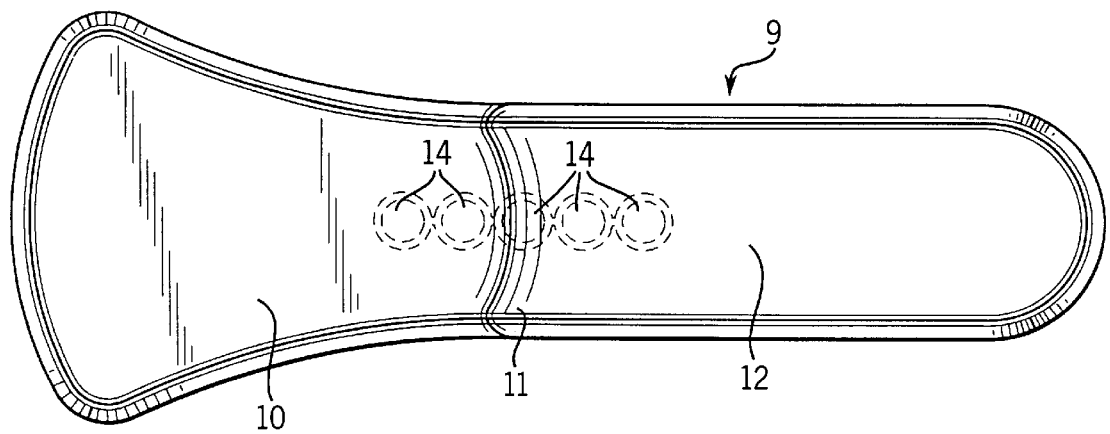
FIG. 3 is a top view of the integrated unit showing the arm and wrist support regions and mouse operation pad. Also shown is a phantom line representation of one embodiment of a hole boss matrix in relation to top of the integrated unit.
Figure 4:
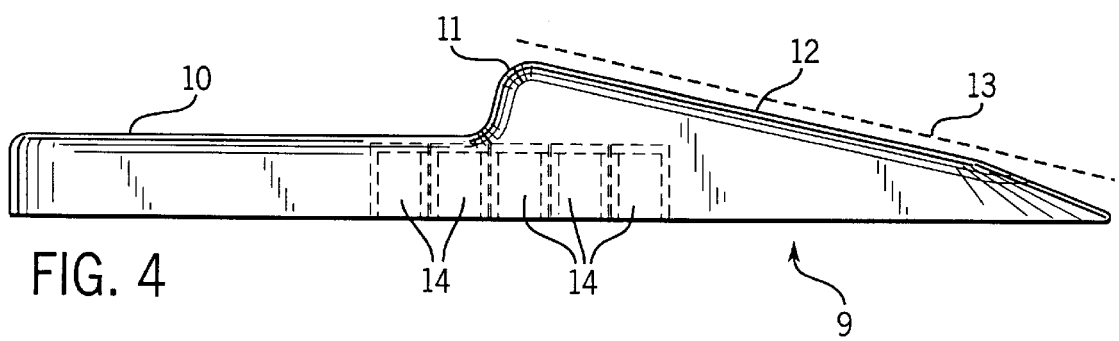
FIG. 4 is a side view of FIG. 3. Also shown is a phantom line representation of the hole boss matrix in relation to the side of the integrated unit.
Figure 13:
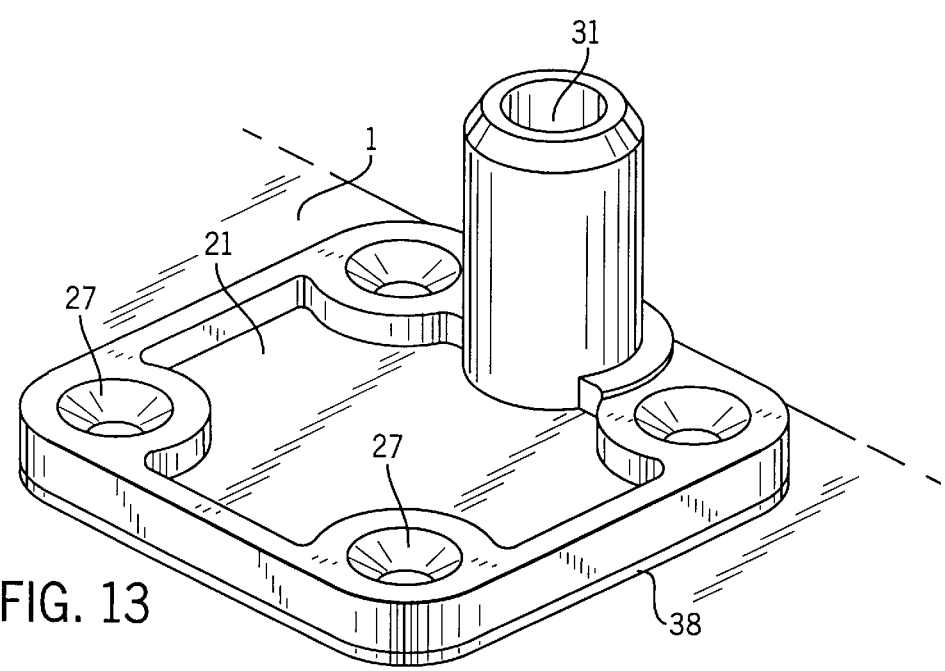
FIG. 13 is a perspective view of the clamp assembly of FIG. 12 installed on the worksurface.

Back region 12 corresponds to the area below the user's forearm, and provides the support and positioning of the entire hand, wrist and forearm on integrated unit 9. The contour of this back region is defined by the best combination of surface contours for comfortable support of the forearm and appropriate surface transition to middle region 11. In addition to these contour considerations, this surface preferably has an inclination 13 (as shown in FIGS. 2, 4 and 13) which extends downwards from the area below the wrist of the user (which is the forward area of the back region that adjoins the middle region) to the area below the elbow of the user (which is the rearward area of the back region, i.e. the area of the back region that is distal to the middle region). This inclination accommodates the natural angularity of the user's forearm while operating a mouse on the computer mouse operation pad from a normal sitting position.

Preferably, back region 12 also has a concave contour resembling a shallow trough which runs the length of the back region, i.e. from wrist to elbow, and it (i.e. the shallow trough) has the appropriate width to accommodate comfortably the user's forearm. One shape of this contour consists of an approximately quarter pipe section with it's longitudinal axis running above and parallel to the inclination plane centerline (as depicted in FIGS. 2, 4 and 13) of back region 12. This contour is not necessarily a true quasi-tubular shape; often it is a complex surface that replicates the approximate surface geometry of the bottom of the human forearm.

The concave contour of back region 12 has the effect of centering the user's forearm on the back region and preventing it (i.e. the forearm) from sliding off the integrated unit when the user effects a rotational movement to it. Such a rotational movement commonly occurs when the user shifts his or her seating position or posture. One of the purposes of the geometry and rotational abilities of the integrated unit is to accommodate these normal user postural shifts, and still retain the positional accuracy of the hand on the mouse. This prevents inadvertent movements of the mouse, e.g. by arm slippage, and the pointing inaccuracies on the computer screen that can result.

In another embodiment of the integrated unit (FIG. 16), forearm support netting 45 is provided. This netting or web is removable or permanently attached to side rails 46 (which extend from front region 10). The netting self-contours to the user's forearm during use. This embodiment also provides relief from perspiration buildup on the user's forearm in warm work environments.

The cross-sectional thickness 19 of integrated unit 9 is such that it provides the desired structural strength, e.g. the strength necessary to maintain the mouse operation pad in a relatively planar position during normal use of the mouse. Consideration for material conservation and cost can also be a factor in the shape of the integrated unit and this may favor coring, e.g. creating a cavity, in the bottom surface or underside of the unit. Commonly, this material is removed from the bottom surface by the process of displacement in the forming tool or die. The cross-sectional thickness of the unit typically increases at the point of transition to the middle region. This transition is typically configured to provide adequate strength against bending or flexing the mouse operation pad relative to the remainder of the unit. If monolithic materials of construction are inadequate to prevent such bending, then a structural stiffening component (not shown) can be added to the bottom or internally to the unit to provide adequate resistance against such bending. In fact, hole bosses 14 perform this strengthening function as well as providing a receptacle for pivot pin 15.

On the bottom surface (FIG. 5) of integrated unit 9 is one or more hole bosses 14 into which pivot pin 15 is inserted and pivotally retained. FIG. 2 shows a cutaway of multiple hole bosses 14 and their relation to the body of integrated unit 9. Of course, only one of these hole bosses are used at any given time, and these bosses are designed to pivotally mate with the pivot pin. The preferred shape of these bosses is cylindrical with or without a slight taper. These hole bosses provide a bearing point and rotational axis for integrated unit 9. Any number of hole bosses can be provided in any pattern or matrix.

Pivot pin 15 is designed to mate with hole bosses 14 and to have the appropriate manufacturing fit and tolerance to hold integrated unit 9 with adequate resistance to unwanted movement and detachment. This fit is enough to prevent unwanted rotation, but it allows enough movement for rotational deflection 18 or upwards removal in the event of an impact, e.g. a user colliding with the bottom surface of the integrated unit as he or she rises from a chair or from collecting an item from below the worksurface, or by a person colliding with a side edge of the integrated unit as he or she passes by the worksurface. The multiple hole boss positions allow for minor adjustments of integrated unit 9. These adjustments, in relation to the desktop or any other worksurface, may be desired for slight changes in user position and user comfort needs.

In the alternative, the multiple hole boss positions can be replaced with one or more slots (not shown) that extend over the length or partial length of the integrated unit, or by one or more other means into which the pivot pin can be inserted and positioned away from the worksurface.

The other constituent part of the computer mouse operation pad and forearm support assembly is a means for attaching the integrated unit to a worksurface (e.g. a desk, table, chairarm, etc.) This means for attachment allows for the rotation and deflection of the integrated unit during normal operation.

Figure 6B:
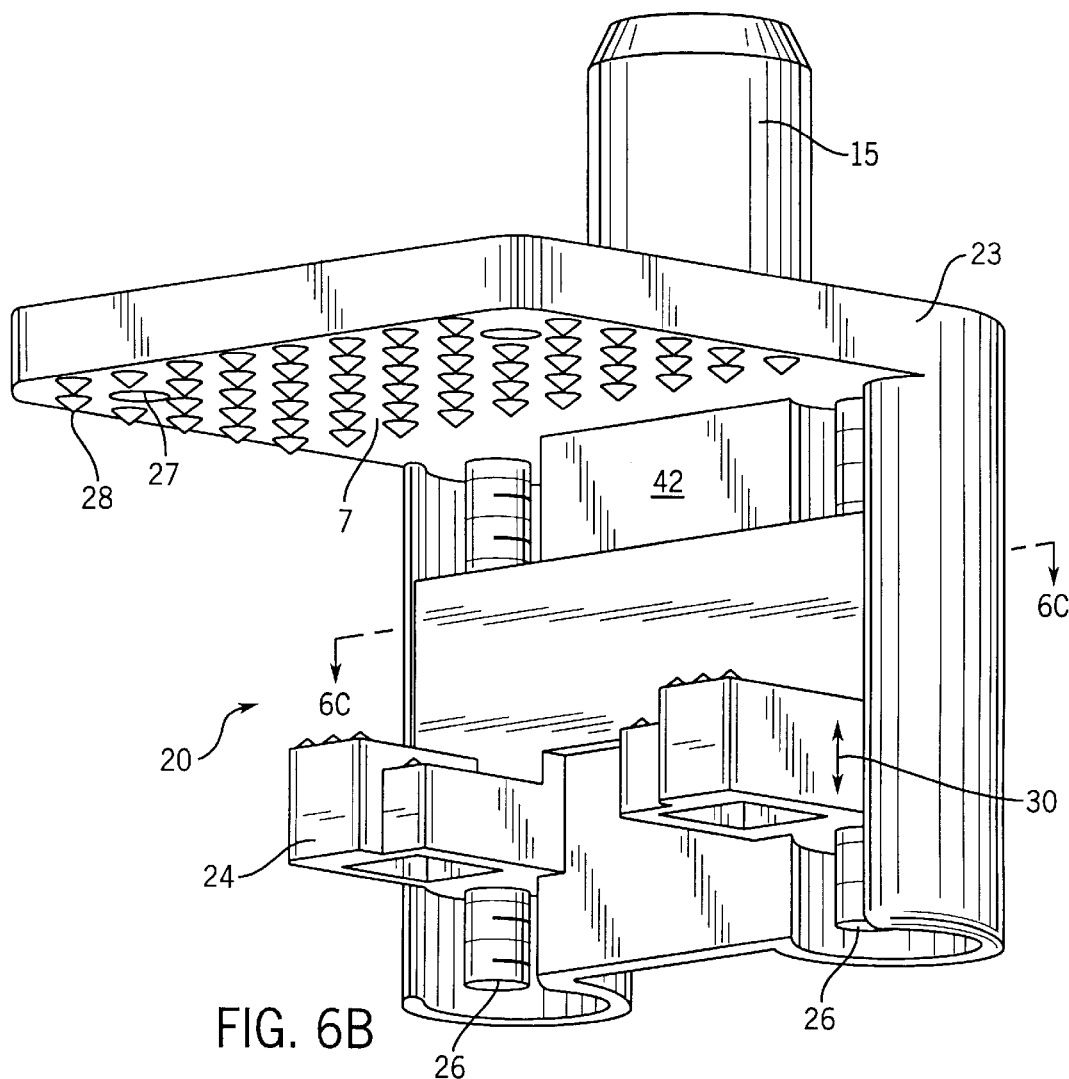
FIG. 6B is a perspective view of the clamp assembly of FIG. 6A assembled.
Figure 7:
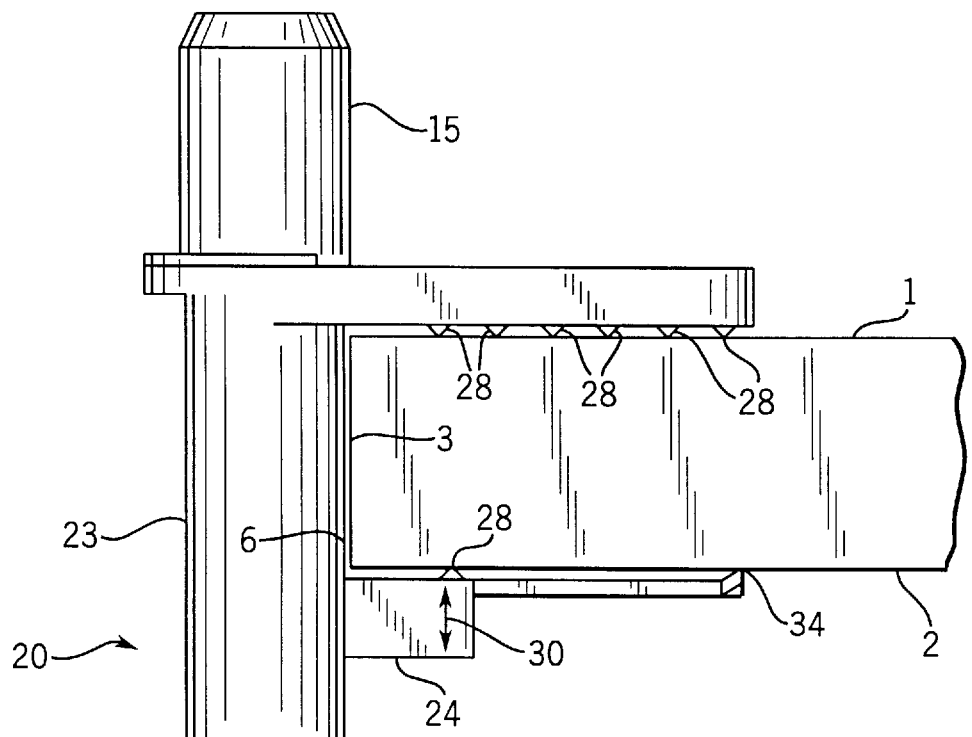
FIG. 7 is a right side view of the clamp assembly of FIG. 6B installed on a conventional worksurface.

One embodiment of the attachment means is clamp assembly 20 (as shown in FIG. 6A). Clamp body 23 is preferably constructed of a suitable metal or high strength polymer. The preferred material of construction is a high strength polymer. Clamp body 23 has a number of primary functions. The worksurface-side of lateral member 7 contains one or more pointed friction points 28 which serve as the contact points with worksurface 1 (FIG. 7). The lower part of clamp assembly 20 is clamp bottom 24. Optionally, a pad (not shown) can be inserted between the pointed friction points 28 and the bottom surface of worksurface I to prevent scratching of the worksurface.

Clamp body 23 also has vertical edges 6 that serve to correctly position the clamp assembly against corresponding front or vertical surface 3 of the worksurface (as shown in FIG. 7). Vertical edges 6 are part of a structure (shown along the line 6C—6C) which extends from lateral member 7 in such a manner as to create a section that resembles two partially-cylindrical channels joined by planar section 42. This shape and its section thickness determines the strength resistance to bending and tension while the clamp assembly is under clamping pressure.

Figure 6C:
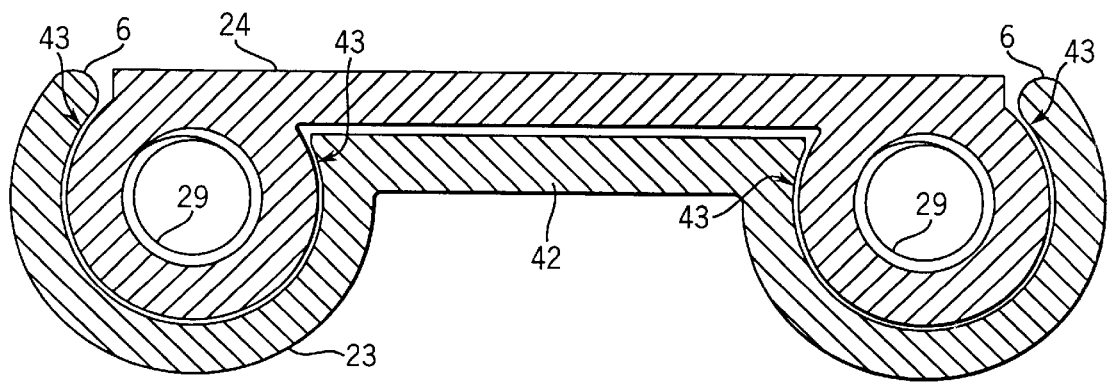
FIG. 6C is a sectional view of FIG. 6B showing the material cross section and mechanical relationship of the clamp body and the clamp bottom.

Moreover, the shape of clamp body 23 provides an indexing space for clamp bottom 24. This indexing space allows clamp bottom 24 free vertical movement (as depicted by double-headed arrow 30 in FIG. 6B) within clamp body 23, and yet it provides resistance to clamp bottom 24 from laterally coming out of clamp body 23 while the clamp assembly is under a clamping force. FIG. 6C illustrates cross-section 6C—6C, and it shows clamp bottom 24 constrained within clamp body 23. The forces generated during the act of clamping tend to deflect the clamp bottom away from free linear movement within the clamping body, but these forces are constrained at points 43 of the clamp assembly.

Extending from the integrated unit side surface of lateral member 7 is pivot pin 15. Preferably, this pivot pin is structurally integral with clamp body 23, and it has the necessary thickness and length to serve as the pivot axis for integrated unit 9. In Preferably, pivot pin 15 contains bore 31 which extends through the center of its longitudinal axis and is of sufficient dimension or diameter to allow for the passage of electrical wire 48 (e.g. the computer mouse cord). Bore 31 allows for the passage of wires from electrical devices on or within integrated unit 9 or from additional worksurface accessories that may use this clamp assembly.

The lateral member of clamp body 23 may also contained countersunk holes 27 which pass through this member in a vertical orientation. Clamping screws 26 pass vertically through these holes, and engage clamp bottom 24. Holes 27 and their shape serve to constrain the downward motion of screws 26 through clamp body 23. Commonly, these holes are countersunk or counterbored in the material of the clamp body. The countersunk or counterbored holes match the contour of the underside of the screwhead of the clamping screw.

Clamp bottom 24 is also preferably made from an injection molded high strength polymer. Clamp bottom 24 has a threaded section 29 or molded or pressed in threaded inserts which serve as receptacles for the clamping screws when the clamp bottom is installed within clamp body 23. The clamp bottom serves as the lower part of the clamp assembly.

Figure 8:
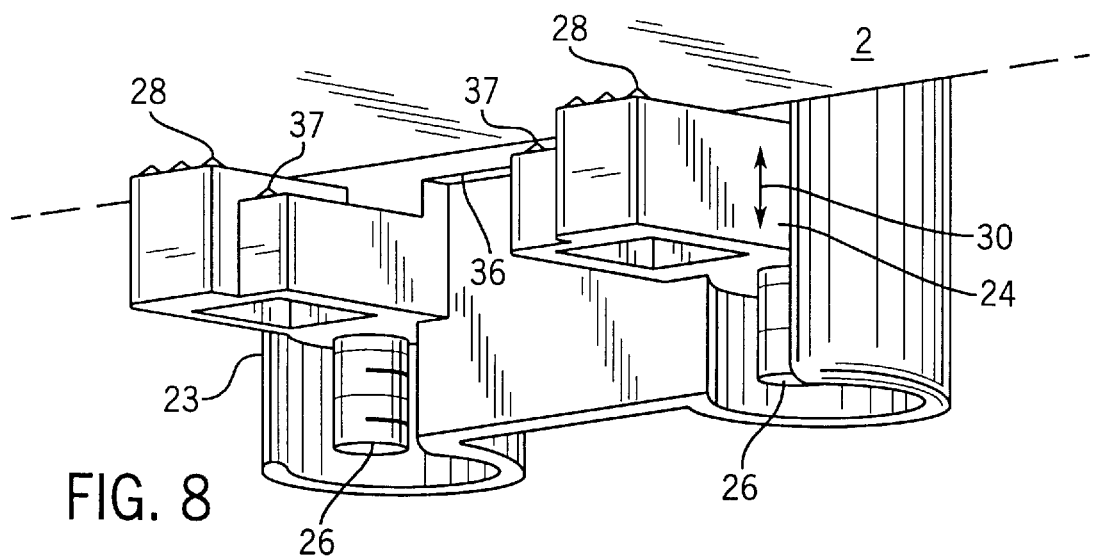
FIG. 8 is a perspective view of the clamp bottom of FIGS. 6B, 6C and 7 attached to the bottom of a work surface.

The worksurface-side surface of lateral member 70 of clamp bottom 24 has adequate length to extend from contact face 71 of clamp bottom 24 to grippingly engage bottom surface 2 of the worksurface (FIGS. 7 and 8). Clamping screws 26 pass through clamp body 23 and engage threads 29 of clamp bottom 24. When screws 26 are turned, commonly clockwise, clamp bottom 24 moves vertically within section 6C of clamp body 23. When clamp assembly 20 is correctly positioned against front surface 3 of the worksurface and clamping screws 26 are tightened, pointed friction points 28 of clamp bottom 24 grippingly engage bottom surface 2 of the worksurface. Vertical edges 6 form contact points with front surface 3. With contact between friction points 28 on the lateral member of clamp body 23 and friction points 28 on the lateral member of clamp bottom 24 and with adequate tightening of clamping screws 26, these friction points grip their respective surfaces of the worksurface in such a manner as to prevent any substantial movement of the computer mouse operation pad and forearm support assembly.

Figure 10:
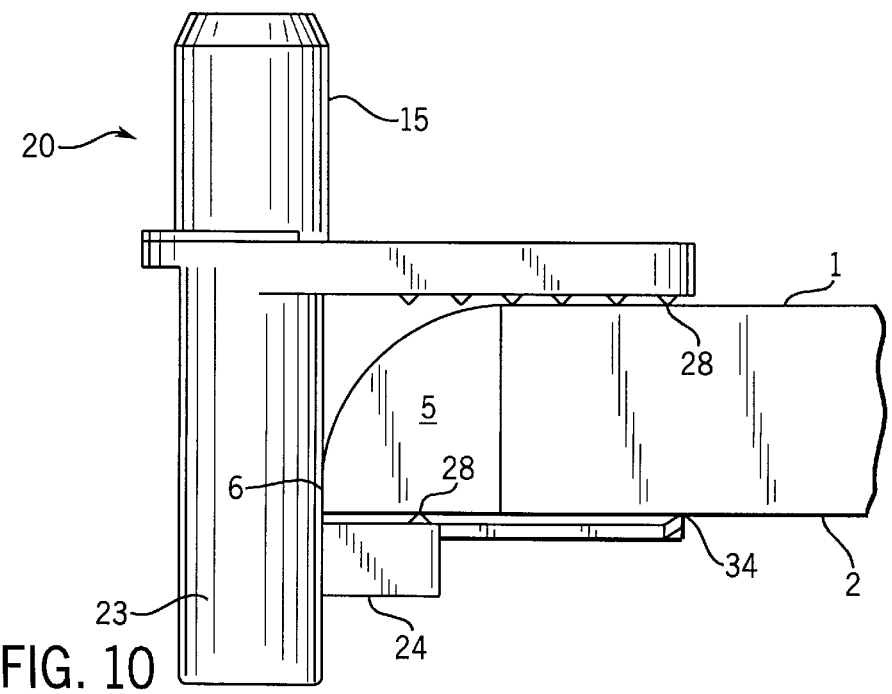
FIG. 10 is a right side view of the clamp assembly of FIG. 9 installed on a worksurface with a contoured front surface or edge.

Some worksurfaces have a contoured front surface (one embodiment of which is shown as 5 in FIG. 10) which may impede the normal engagement of clamp assembly 20 to the worksurface because of the offset of friction points 28 contacts, i.e. because the friction points on lateral member 70 will not align with those on lateral member 7. This condition can cause the clamp assembly to cock and/or loosen. By moving the lower contact points inward on bottom surface 2, the tendency to cock or loosen is lessened.

Figure 9:
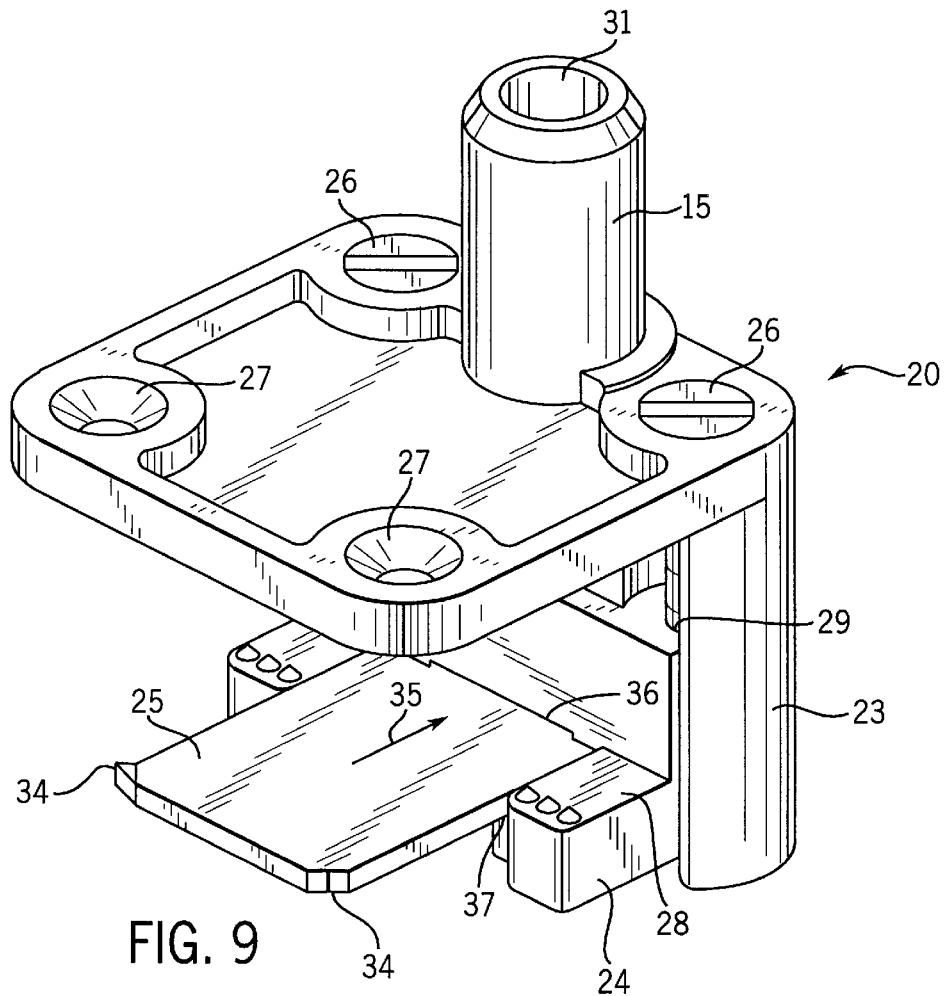
FIG. 9 is a perspective view of the clamp assembly of FIG. 6B showing the installation of a disengageable lateral extension insert into the clamp bottom.

The contact points between the clamp bottom and the bottom surface of the worksurface can be moved inward on the worksurface by use of optional extension insert 25 which is installed in clamp bottom 24 by sliding (as depicted by arrow 35 in FIG. 9) it into clearance slot 36 (which is located in beneath contact face 71 of clamp bottom 24. Extension insert 25 is held in position by slot 36 and by contact pressure points 37. Contact pressure points 37 are geometrically arranged in such a manner that extension insert 25 is angled slightly upward towards bottom surface 2 so that gripping tangs 34 contact bottom surface 2 first and then grippingly engage bottom surface 2 as clamping screws 26 are tightened. The action of the extension insert is to move the desk bottom contact point inward and increase clamping ability on contoured desk edges.

Figure 12:
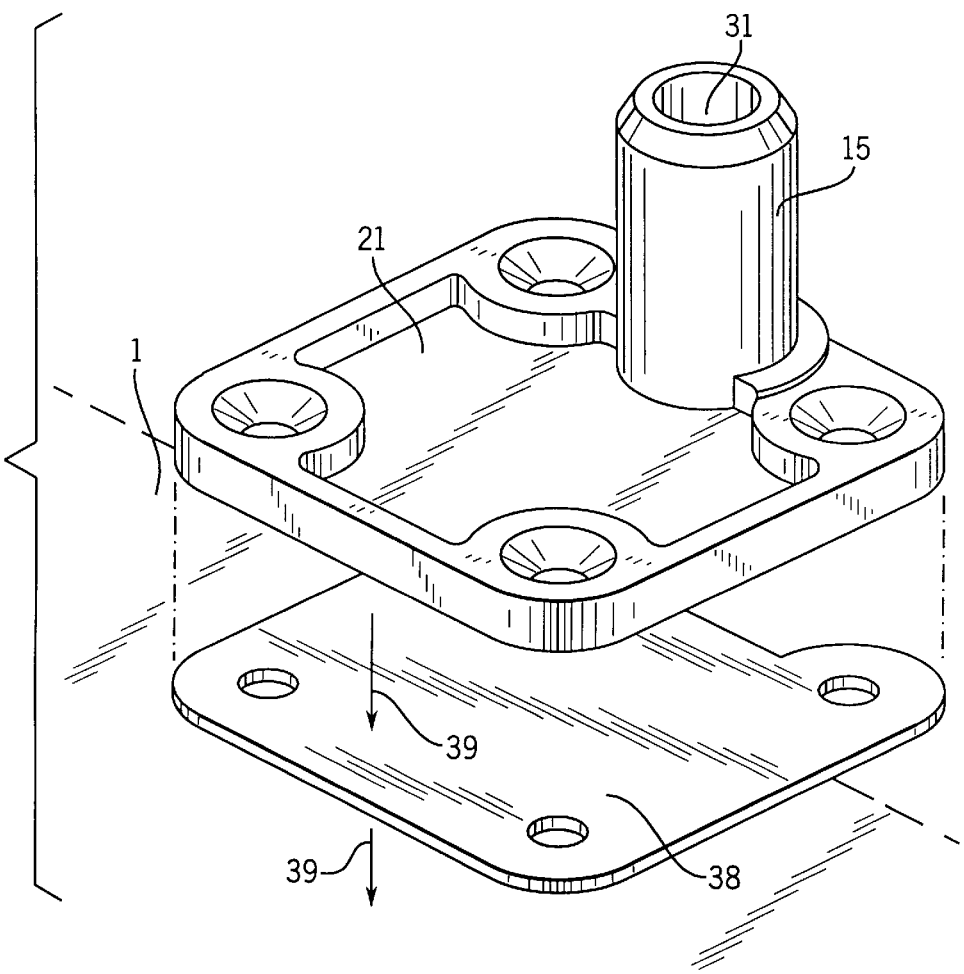
FIG. 12 is an exploded perspective view of another embodiment of a clamp assembly in which tape is used to mount the clamp assembly to the top surface of a work surface.
Figure 17:
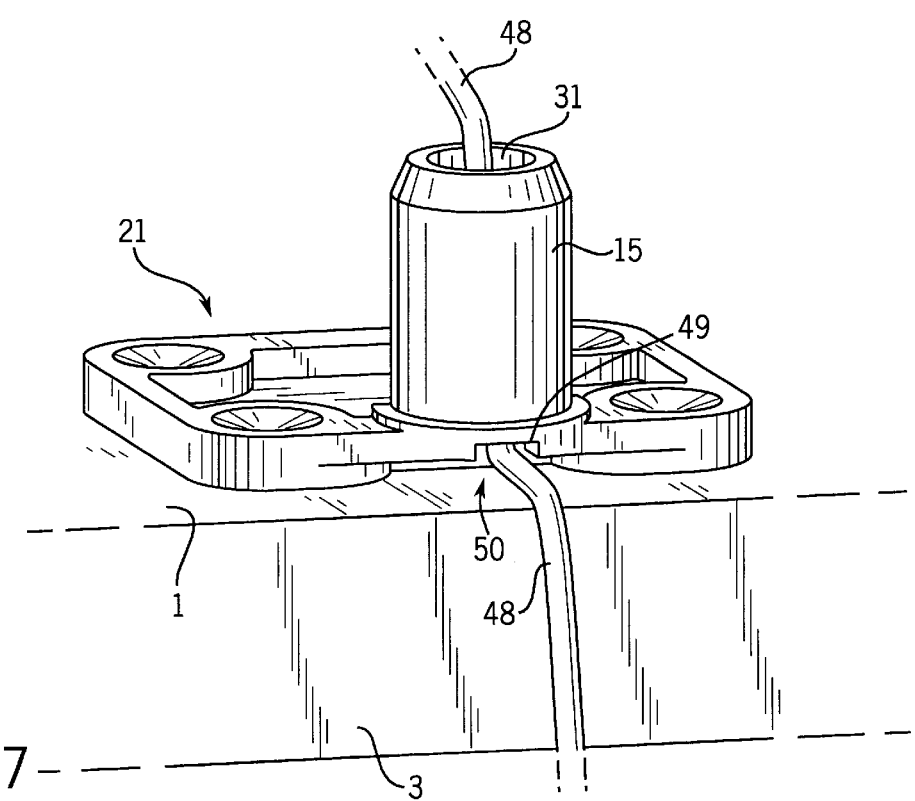
FIG. 17 is a perspective view of the tape surface mount variant of FIG. 13 showing the passage of an electrical wire through the bore of the pivot pin.

Another embodiment of a clamp assembly is shown in FIGS. 12 and 13. With tape-type clamp assembly 21, integrated unit 9 can be attached or mounted to the top surface of any worksurface regardless of the contour of its front surface or edge. This clamp assembly is attached to the top surface of worksurface 1 by means of double-sided adhesive tape 38. The characteristics of pivot pin 15 and the lateral member of the clamp body are essentially the same as those described above for clamp assembly 20. The worksurface side of the lateral member is free of friction points 28 to provide a large, flat contact surface for the adhesive tape. Tape type clamp assembly 21 is typically attached (as depicted by arrows 39 in FIG. 12) to the double-sided tape and then the other side of the tape is brought into pressing contact with the top surface of work surface 1. In FIG. 17 the tape-type clamp assembly is shown attached to worksurface 1 and an electrical wire 48 is shown passing both through bore 31 and between the lateral member of tape-type clamping assembly and worksurface 1. This clearance is provided by slot 49 which is located on the worksurface-side of the lateral member of the tape-type clamp assembly. The wire can then be draped over the front surface or edge of the worksurface or it can run along the top surface of the worksurface.

In another embodiment (FIGS. 21–25) of a clamp assembly that can attach integrated unit 9 to a work surface regardless of the contour of the front surface or edge 5 of the worksurface, bottom mount clamp assembly 22 is attached to the bottom surface of worksurface 2. This attachment method uses L-shaped bottom mount bracket 51 which is fastened to bottom surface 2 by means of any suitable mechanical fasteners, e.g. wood screws 32, which can pass though one or more of holes 55 that are present in bottom mount bracket 51 for that purpose. Alternatively, this bottom mount bracket can be attached to the bottom surface of the worksurface by means of double-sided adhesive tape in the same manner as that described above for the tape-type clamp assembly.

Bottom mount bracket 51 is typically an L-shaped bracket of fabricated sheet metal with the front surface or edge-side approximately planer and parallel to the front surface or edge of the worksurface. This planar surface has a contact face 63 that provides a contact surface with pivot pin slider 52. Protruding from contact face 63 is U-shaped male channel section 61 which engages female channel 60 in pivot pin slider 52 in such a manner as to hold the slider in a vertical position and allow vertical linear travel (as depicted by double-headed arrow 57 in FIG. 22) of slider 52 on bottom bracket 51. This vertical linear travel allows height adjustment of integrated unit 9 on worksurfaces of different thickness.

Also located on male channel 61 section of bottom bracket 51 is a series of truncated holes 58. These holes are aligned in a vertical direction and the diameters of the holes intersect in such a way as to form distinct positions into which slider locking screw 53 can fit. Truncated holes 58 prevent pivot pin slider 52 from slipping downward under a vertical load by constraining slider locking screw 53 to distinct positions. Male channel section 61 also serves to prevent the slider locking nut 54 from turning when slider locking screw 53 is tightened. Slider locking nut 54 is constrained within male channel 61 in such a way that side clearance 64 prevents nut rotation but still allows nut 54 to move vertically within channel 61 during a vertical adjustment. Screw 53, slider 52, bracket 51 and nut 54 are held together in the proper operational position by assembly on axis 62. Slider 52 has all the characteristics necessary to pivotally attach to integrated unit 9 as defined above, and it also has the ability to have wire 48 pass through bore 31 of pivot pin 15. Slider 52 is also equipped with slot 56 to facilitate assembly and for manufacturing considerations.

Figure 1:
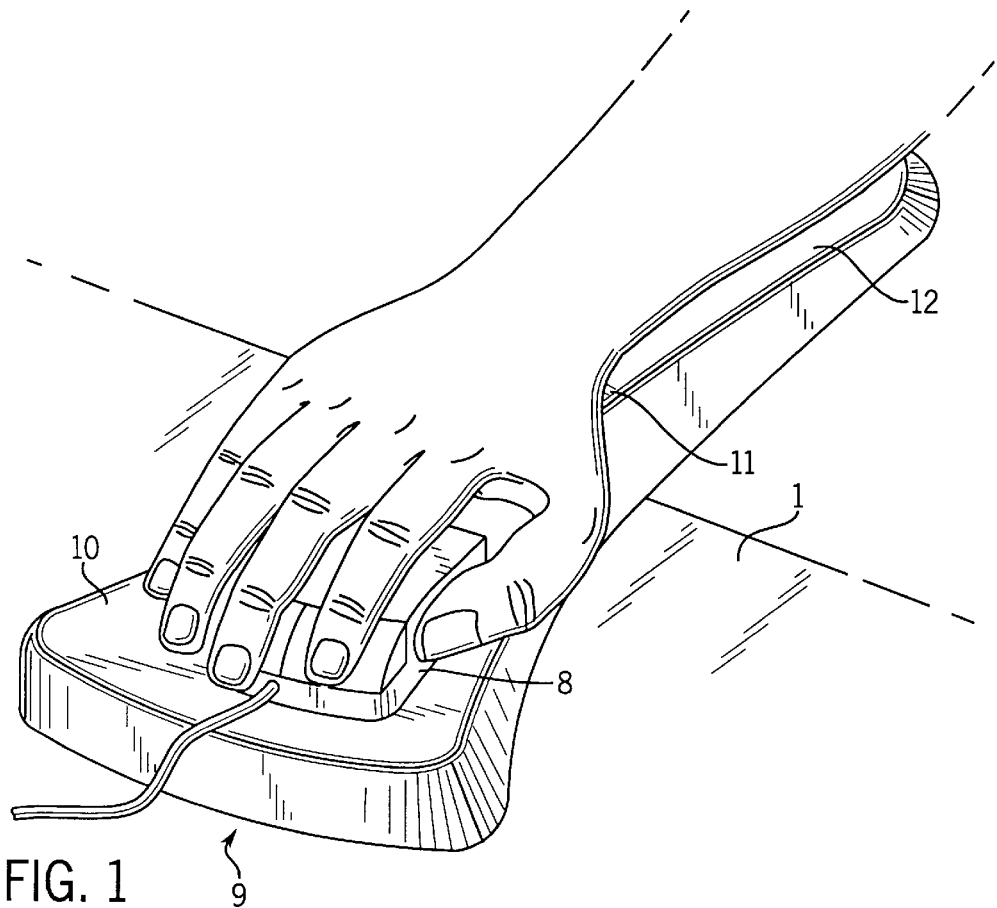
FIG. 1 is a full perspective view of the computer mouse operation pad and forearm support assembly in use. Also shown is the position of the mouse on the operation pad and the hand of the user in the approximate position required to manipulate the mouse. This combination of the mouse, assembly and the user's lower arm are shown as a working unit located over the top surface and front surface (or edge) of a worksurface.
Figure 11:
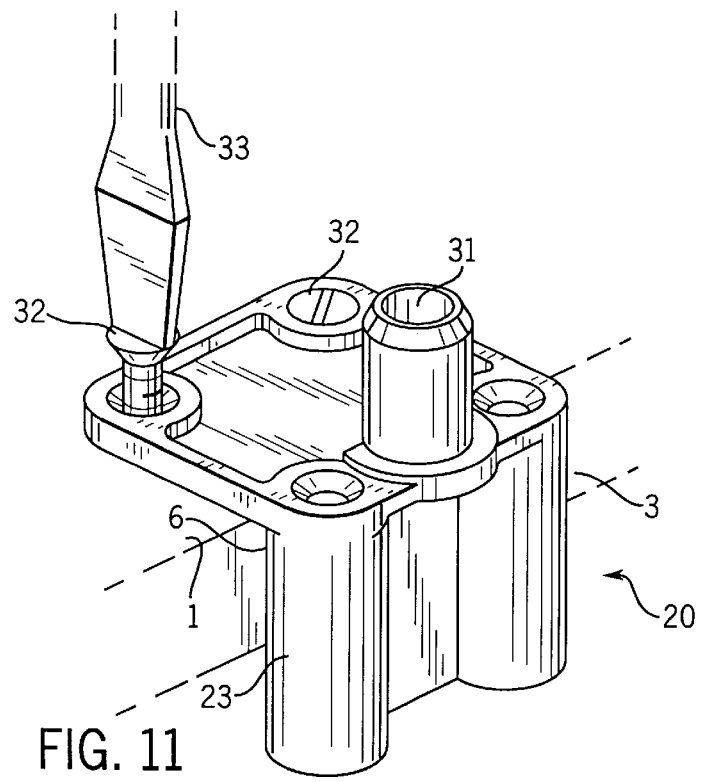
FIG. 11 is a perspective view of another embodiment of a clamp assembly in which a mechanical fastener is used to attach the clamp assembly to the top surface of a worksurface.
Figure 14:
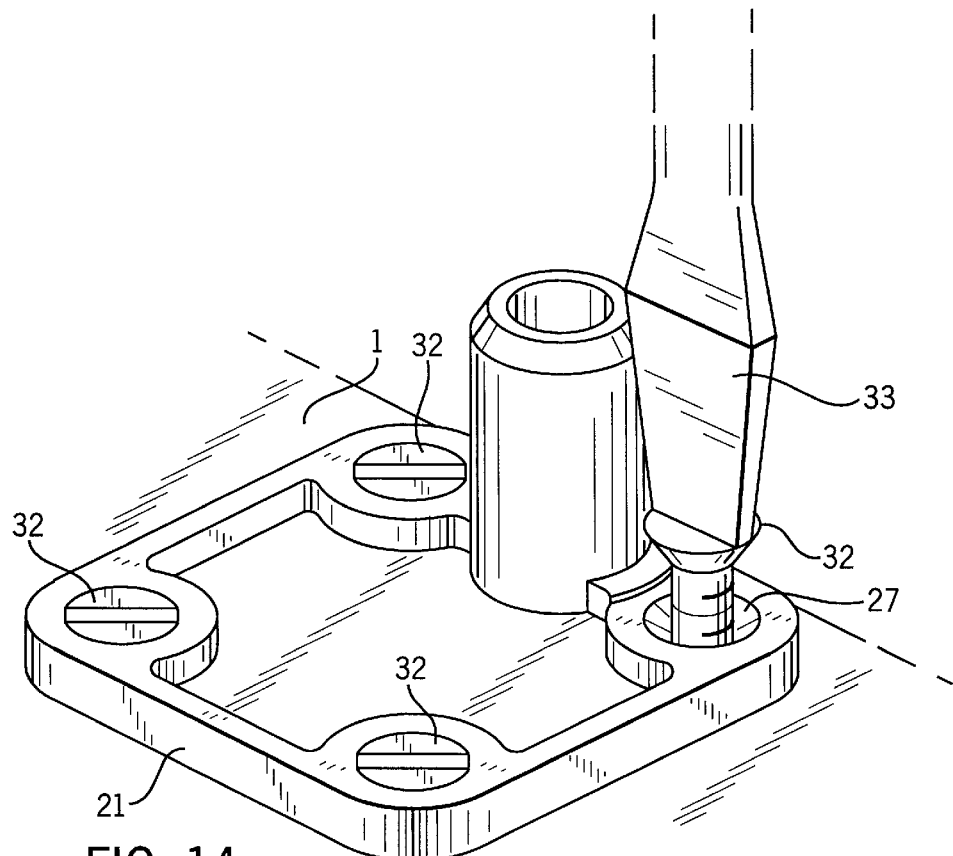
FIG. 14 is a perspective view of the clamp assembly of FIG. 12 installed with mechanical fasteners as an alternative to tape.

In addition to the methods of attachment described above, clamp body 23 and tape-type surface mount 21 can be attached to the worksurface by means of any suitable mechanical fasteners, e.g. wood screws 32, by using holes 27 (FIGS. 11 and 14). This method will, of course, damage the worksurface, but in some circumstances it may be acceptable to the user.

Figure 15:
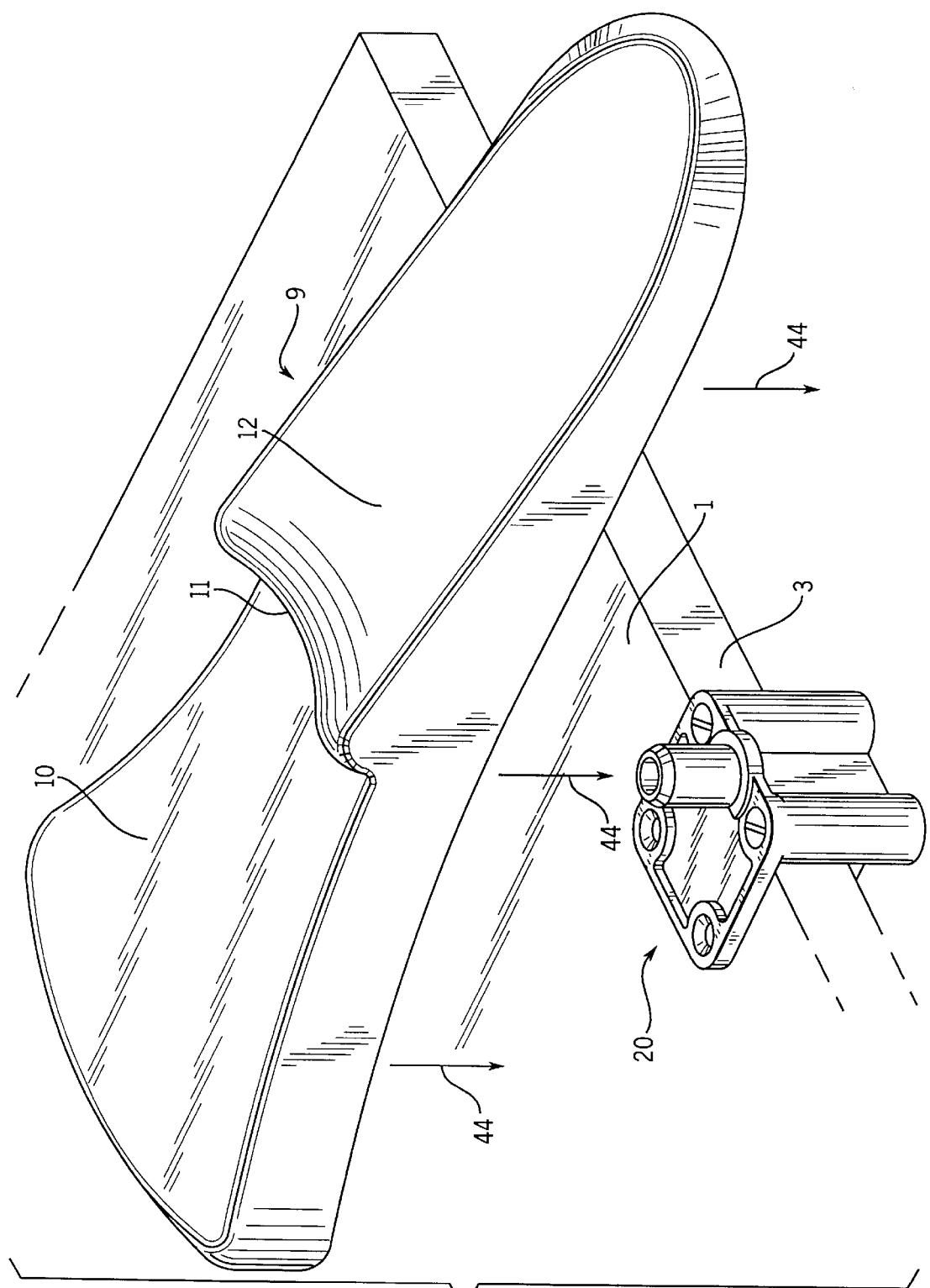
FIG. 15 is an exploded perspective view showing the relative motion a user would perform to assemble the integrated unit to one embodiment of the clamp assembly.

Once the clamp assembly is securely attached to the work surface, integrated unit 9 is attached to it by inserting pivot pin 15 into one of hole bosses 14 (as depicted by arrows 44 in FIG. 15). FIG. 2 shows the actual inserted position of the pivot pin within one of the hole bosses on the bottom surface of integrated unit 9.

At this point the computer mouse operation pad and forearm support assembly, i.e. integrated unit 9 and a clamp assembly, is ready for use. The rotation of integrated unit 9 on pivot pin 15 has a number of functions. Rotation allows access to drawers that may be located below the integrated unit. It also allows the user to shift seating positions and postures while still retaining proper support for the forearm. Rotation also prevents injury from walking contact with integrated unit 9.

Figure 5:
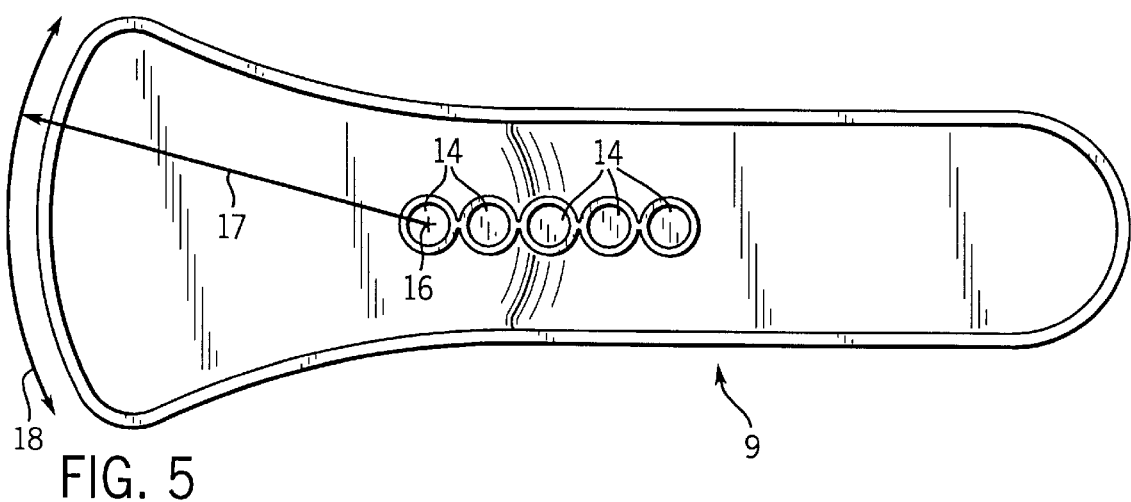
FIG. 5 is a bottom view of FIG. 3 showing the hole boss matrix and the rotational freedom provided by the pivot pin.

Rotational degree of freedom 18 is depicted in FIGS. 2 and 5 which show integrated unit 9 rotating about vertical pivot pin axis 16 which is normal, i.e. perpendicular, to the plane of worksurface 1. In normal operation, this rotational degree of freedom is limited only by the comfort requirements of the user. The degree of freedom is actually complete rotation about the axis, but this is seldom required.

FIG. 5 also shows relation 17 between the hole bosses and the rotational degree of freedom. Each individual hole boss in matrix 14 creates its own rotational degree of freedom when used as the receptacle for the pivot pin. When a user places the pivot pin in a hole boss, the front-to-back and/or side-to-side position of integrated unit 9 is changed in relation to pivot pin 15. This change also changes the position relative to the worksurface and the user. This minor repositioning allows the user to find a position suitable to his or her individual needs relative to their spatial relationship to the work surface, and to his or her seating posture.

Optional to this invention is slip cover 65 (FIG. 19) that fits over middle region 11 and back region 12 (or optionally just over back or a part of back region 12) of integrated unit 9. Slip cover 65 is properly contoured to fit snugly over the back region 12 of the integrated unit 9 and properly contoured at 68 to hold the slip cover firmly on the integrated unit 9 when a user would impart a backward motion to the slip cover. Other methods of securing the slip cover include a (i) elastic hem (not shown), (ii) straps 66 with a suitable snap closure or hook and loop closure at a location 67 on strap 66, or (iii) a pad or similar device (not shown) one surface designed to engage comfortably the user's forearm and the opposite surface comprising an adhesive, e.g. a pressure-sensitive adhesive, to attach the pad to the top surface of the forearm support. These slip covers can be made from any number of materials including plastics, fabrics, rubber, sheepskin or gel-filled membranes. Purposes for using a slip cover include increase in user comfort, aesthetic treatments and advertising space, and to accommodate various hypoallergenic or antimicrobial situations.

Other optional computer mouse operation pad and forearm support assembly configurations include an adjustment device that can be located between the pivot pin and the integrated unit which would increase the adjustment range or provide a guide for placing the integrated unit on the pivot pin.

In addition to the above mentioned features of the integrated unit 9, printing, suitable graphics depictions, embossing, engraving, surface texturing or coating can be imparted to the surfaces of the integrated unit for promotional or advertising purposes. Also the incorporation of a trackball type pointing device and its attendant mechanisms and/or electrical devices can be incorporated into integrated unit 9 in the front region.

Although the various clamp assemblies are described principally in the context of rotatively supporting the integrated unit of mouse operation pad and forearm support, these clamp assemblies can support, rotatively or otherwise, other objects, e.g. reading lamps, book or page holders, food trays, secondary worksurfaces, etc. These other objects can attach to the clamp assembly by means of one or more hole bosses attached to the object or by any other suitable means.

While this invention has been described in considerable detail through the preceding specific embodiments, this detail is for purposes of illustration. Many variations and modifications can be made by one skilled in the art without departing from the spirit and scope of the invention as it is described in the appended claims.

What is claimed is:

1. A computer mouse operation pad and forearm support assembly for providing forearm and wrist support to a user operating a computer mouse on a computer mouse operation pad from a sitting position, the assembly comprising:

(i) an integrated unit formed of a computer mouse operation pad joined to a forearm support in such a manner that a front region is defined by the computer mouse operation pad, a back region is defined by the forearm support, and a middle connecting region comprising a complex curved surface defining an elevation change between the front region and the back region, the back region having a forward area adjoining the middle region and a rearward area distal to the middle region with an inclination extending downwards from the forward area to the rearward area so as to accommodate the natural angularity of the user's forearm while the user operates the computer mouse on the computer mouse operation pad from a normal sitting position, and (ii) means for attaching the integrated unit to a worksurface having top, front and bottom surfaces, the integrated unit pivotally attached to the means for attaching, whereby the computer mouse operation pad provides a tractive surface for a computer mouse sensor ball.

2. The assembly of claim 1 in which the back region further comprises a shallow trough contour to support comfortably the forearm of the user.

3. The assembly of claim 2 in which the integrated unit is constructed from a single material.

4. The assembly of claim 3 in which the material is selected from the group consisting of plastic and metal.

5. The assembly of claim 4 in which the integrated unit is made from injection molded plastic.

6. The assembly of claim 1 in which the back region is further defined by (i) a pair of parallel side rails extending from the front region, and (ii) a netting attached to the side rails for providing support to the forearm of the user while the user is operating the computer mouse on the computer mouse operation pad.

7. The assembly of claim 6 in which the middle region is an open space defining an elevation change between the front region and the back region.

8. The assembly of claim 1 in which the integrated unit comprises a top surface and a bottom surface, the top surface upon which the computer mouse is operated on the front region while the forearm of the user rests on the back region, and the bottom surface comprising at least one means for pivotally attaching the integrated unit to the means for attaching the integrated unit to a worksurface.

9. The assembly of claim 8 in which the means for pivotally attaching the integrated unit to the means for attaching the integrated unit to a worksurface is a hole boss adapted to receive a pivot pin of the means for attaching the integrated unit to a worksurface.

10. The assembly of claim 9 in which the means for attaching the integrated unit to the worksurface comprises:

(A) a clamp body comprising (i) a pivot pin designed to fit pivotally within the hole boss attached to the bottom surface of the integrated unit, and (ii) a lateral member designed to engage the top surface of the worksurface;

(B) a clamp bottom designed to nest within the clamp body, the clamp bottom comprising a lateral member designed to engage the bottom surface of the worksurface; and (C) means for nesting the clamp bottom within the clamp body and for drawing the lateral member of the clamp body into a gripping relationship with the top surface of the worksurface and the lateral member of the clamp bottom into a gripping relationship with the bottom surface of the worksurface.

11. The assembly of claim 10 in which the pivot pin further comprises a bore with an axis adapted to be normal to the worksurface and through which an electrical cord can pass.

12. The assembly of claim 11 in which the clamp body further comprises edges normal to the lateral member of the clamp body, the edges adapted to correspond to the front surface of the worksurface and providing an indexing space to assist in forming the gripping relationship between the lateral member of the clamp body and the top surface of the worksurface and the lateral member of the clamp bottom and the bottom surface of the worksurface.

13. The assembly of claim 12 in which the clamp body and the clamp bottom further comprise at least one bore adapted to receive a clamping screw, the bore of the clamp body aligned with the bore of the clamp bottom such that a single clamping screw can be simultaneously fitted to both in a manner that brings the lateral member of the clamp body into a gripping relationship with the top surface of the worksurface and the lateral member of the clamp bottom into a gripping relationship with the bottom surface of the worksurface.

14. The assembly of claim 12 in which the lateral member of the clamp bottom is shorter in length than the lateral member of the clamp body.

15. The assembly of claim 14 in which the clamp bottom further comprises a disengagable lateral extension insert adapted to grippingly engage the bottom surface of the worksurface.

16. The assembly of claim 9 in which the means for attaching the integrated unit to the worksurface comprises a clamp body comprising (i) a pivot pin designed to fit pivotally within the hole boss attached to the bottom surface of the integrated unit, and (ii) a lateral member having an upper and a lower surface, the lower surface designed to engage fixedly the top surface of the worksurface.

17. The assembly of claim 16 in which the lateral member comprises at least one bore through which a fastener can secure the clamp body to the top surface of the worksurface.

18. The assembly of claim 16 in which the lower surface of the lateral member further comprises an adhesive by which the clamp body is securely attached to the top surface of the worksurface.

19. The assembly of claim 18 in which the adhesive is a double-sided tape.

20. The assembly of claim 16 in which the lateral member of the clamp body further comprises a recess which is at least partially aligned with the bore of the pivot pin and through which an electrical cord can pass.

21. The assembly of claim 9 in which the means for attaching the integrated unit to the worksurface comprises:

(A) a clamp body comprising (i) a pivot pin designed to fit pivotally within the hole boss attached to the bottom surface of the integrated unit, and (ii) a slider securely attached to the pivot pin and comprising a contact face designed to engage the front surface of the worksurface; and (B) an L-shaped bottom mount bracket one leg of which slidingly nests within the slider and the other leg of which engages the bottom surface of the worksurface.

22. The assembly of claim 21 in which the leg of the bottom mount bracket that nests within the slider further comprises means for adjusting the position of the slider relative to the bottom mount bracket.

23. The assembly of claim 9 in which the means for attaching the integrated unit to the worksurface comprises a clamp body comprising (i) a pivot pin designed to fit pivotally within the hole boss attached to the bottom surface of the integrated unit, (ii) a slider securely attached to the pivot pin and comprising a contact face designed to engage the front surface of the worksurface, and (iii) means for securely fixing the slider at the contact face to the front surface of the worksurface.

24. The assembly of claim 23 in which the means for securely fixing the slider at the contact face to the front surface of the worksurface is a fastener.

25. The assembly of claim 10 in which the clamp body is a one-piece unit made from a single material.

26. The assembly of claim 25 in which the material is selected from the group consisting of plastic and metal.

27. The assembly of claim 26 in which the clamp body is made from injection molded plastic.

28. The assembly of claim 10 in which the clamp bottom is a one-piece unit made from a single material.

29. The assembly of claim 28 in which the material is selected from the group consisting of plastic and metal.

30. The assembly of claim 29 in which the clamp bottom is made from injection molded plastic.

31. The assembly of claim 1 in which the integrated unit further comprises a slip cover.

32. The assembly of claim 31 in which the slip cover fits snugly over the back region.

33. The assembly of claim 32 in which the slip cover comprises at least of an elastic hem and a strap.

34. A computer mouse operation pad and forearm support assembly for providing forearm and wrist support to a user operating a computer mouse on a computer mouse operation pad from a sitting position, the assembly comprising an integrated unit formed of a computer mouse operation pad joined to a forearm support in such a manner that a front region is defined by the computer mouse operation pad, a back region is defined by the forearm support, and a middle connecting region comprising a complex curved surface defining an elevation change between the front region and the back region, the back region having a forward area adjoining the middle region and a rearward area distal to the middle region with an inclination extending downwards from the forward area to the rearward area so as to accommodate the natural angularity of the user's forearm while the user operates the computer mouse on the computer mouse operation pad from a normal sitting position, whereby the computer mouse operation pad provides a tractive surface to a computer mouse sensor ball.

* * * * *